US012718648B2

(12) United States Patent
Chen

(10) Patent No.: US 12,718,648 B2

(45) Date of Patent: Aug. 25, 2026

(54) METHOD AND APPARATUS FOR MANAGING STORAGE CABINET

(71) Applicant: BOE TECHNOLOGY GROUP CO., LTD., Beijing (CN)

(72) Inventor: Mingxuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 395 days.

(21) Appl. No.: 18/577,501

(22) PCT Filed: Dec. 21, 2022

(86) PCT No.: PCT/CN2022/140637

§ 371 (c)(1),
(2) Date: Jan. 8, 2024

(87) PCT Pub. No.: WO2024/130584

PCT Pub. Date: Jun. 27, 2024

(65) Prior Publication Data

US 2025/0095430 A1 Mar. 20, 2025

(51) Int. Cl.

*G07F 9/00* (2006.01)
*G07F 9/02* (2006.01)

(52) U.S. Cl.

CPC .............. *G07F 9/006* (2013.01); *G07F 9/026* (2013.01)

(58) Field of Classification Search

CPC .......... G07F 9/006; G07F 9/026; H04N 7/188
See application file for complete search history.

(56) References Cited

U.S. PATENT DOCUMENTS

| | | | | |
|---|---|---|---|---|
| 8,151,980 B2 * | 4/2012 | DeMartino | A47G 29/08 | |
| | | | 211/85.2 | |
| 11,581,099 B1 * | 2/2023 | Rufo | G16H 20/13 | |
| 12,437,258 B2 * | 10/2025 | Savvides | G06F 18/22 | |
| 2019/0236531 A1 * | 8/2019 | Adato | H04N 23/611 | |
| 2020/0005231 A1 * | 1/2020 | Nakagawa | G08B 13/19613 | |
| 2024/0330964 A1 * | 10/2024 | Budano | G06Q 10/105 | |

* cited by examiner

*Primary Examiner* — Michael Collins
(74) *Attorney, Agent, or Firm* — Dority & Manning, P.A.

(57) ABSTRACT

A method for managing a storage cabinet is provided. The method includes: in response to opening the storage cabinet, acquiring frames of image data of inside of the storage cabinet at a current time; if a time interval between the current time and a first time is greater than a preset duration, and a number of times the storage cabinet is opened between the current time and the first time is greater than a first preset number of times, determining, according to the frames of image data, whether there exists a foreign object, the first time being a time when alarm information is transmitted before the current time; and if there exists the foreign object, and a number of times existence of the foreign object is determined between the current time and the first time is greater than a second preset number of times, transmitting the alarm information.

20 Claims, 10 Drawing Sheets

METHOD AND APPARATUS FOR MANAGING STORAGE CABINET

CROSS-REFERENCE TO RELATED APPLICATION

This application is a national phase entry under 35 USC 371 of International Patent Application No. PCT/CN2022/140637 filed on Dec. 21, 2022, which is incorporated herein by reference in its entirety.

TECHNICAL FIELD

The present disclosure relates to the field of image processing technologies, and in particular, to a method and an apparatus for managing a storage cabinet.

BACKGROUND

With the continuous development of technology, there are more and more intelligent cabinets (such as automatic vending machines, unmanned cabinets, and the like). The widespread use of the intelligent cabinets not only brings convenience to people, but also greatly reduces the working hours of staff.

Under normal circumstances, once detecting that an item/commodity not belonging to the intelligent cabinet (i.e., a foreign object) is placed inside the intelligent cabinet, the intelligent cabinet will give an alarm. However, frequent alarms, false alarms, and missed alarms may occur in the intelligent cabinet in some cases. For example, if the intelligent cabinet misjudges an item belonging to the intelligent cabinet as a foreign object, there will be a false alarm; alternatively, if a foreign object is misjudged as an item belonging to the intelligent cabinet, there will be a missed alarm. These cases will bring inconvenience to the management of the staff.

SUMMARY

In an aspect, a method for managing a storage cabinet is provided. The method includes: in response to opening the storage cabinet, acquiring a plurality of frames of image data of inside of the storage cabinet at a current time, where the storage cabinet is used to store items; if a time interval between the current time and a first time is greater than a preset duration, and a number of times the storage cabinet is opened between the current time and the first time is greater than a first preset number of times, determining, according to the plurality of frames of image data, whether there exists a foreign object in the storage cabinet, where the first time is a time when alarm information is transmitted before the current time, and the alarm information is used to alert that the foreign object exists in the storage cabinet; and if there exists the foreign object in the storage cabinet, and a number of times existence of the foreign object in the storage cabinet is determined between the current time and the first time is greater than a second preset number of times, transmitting the alarm information.

In some embodiments, the "acquiring a plurality of frames of image data of the inside of the storage cabinet at a current time" includes: in a case where an opening angle of a cabinet door of the storage cabinet is within a preset angular range and angular acceleration of the cabinet door is within a preset angular acceleration range, capturing images of the inside of the storage cabinet a plurality of times to obtain the plurality of frames of image data.

In some embodiments, the preset angular range is any angular range between 45 degrees and 50 degrees, and the preset angular acceleration range is any angular acceleration range between 0 and 10 radians per second squared.

In some embodiments, the "determining, according to the plurality of frames of image data, whether there exists a foreign object in the storage cabinet" includes: acquiring feature information of items in each frame of image data in the plurality of frames of image data; and determining, according to feature information of items in the plurality of frames of image data and a preset feature information library, whether there exists the foreign object in the storage cabinet. The preset feature information library includes feature information of a plurality of items belonging to the storage cabinet, and the foreign object refers to an item that does not belong to the storage cabinet.

In some embodiments, the "determining, according to feature information of items in the plurality of frames of image data and a preset feature information library, whether there exists the foreign object in the storage cabinet" includes: if there exists an item in all the items included in the plurality of frames of image data, a similarity between feature information of the item and feature information of any one of items in the preset feature information library is less than a first preset value, and a total number of times the item has been recognized is greater than or equal to a first preset numerical value, determining that there exists the foreign object in the storage cabinet; and if similarities between the feature information of all the items included in the plurality of frames of image data and feature information of the items in the preset feature information library are all greater than or equal to the first preset value, or the total number of times the item has been recognized is less than the first preset numerical value, determining that there exists no foreign object in the storage cabinet.

In some embodiments, the first preset numerical value is half of the number of the plurality of frames of image data.

In some embodiments, the method further includes: for any frame of image data in the plurality of frames of image data, for example, first image data, in a case where a foreign object feature information library includes feature information of at least one foreign object, if it is determined that there exists a foreign object in the first image data and a similarity between feature information of the foreign object in the first image data and the feature information of the foreign object in the foreign object feature information library is greater than a second preset value, increasing a number of times the foreign object has been recognized by a first value to obtain a total number of times the foreign object has been recognized; and if the similarity between the feature information of the foreign object in the first image data and the feature information of the foreign object in the foreign object feature information library is less than or equal to the second preset value, writing the feature information of the foreign object in the first image data into the foreign object feature information library. The foreign object feature information library includes feature information of a foreign object recognized in image data whose capturing moment is earlier than the first image data in the plurality of frames of image data.

In some embodiments, the method further includes: if the foreign object feature information library is empty, and there exists the foreign object in the first image data, writing the feature information of the foreign object in the first image data into the foreign object feature information library.

In some embodiments, the method further includes: if the time interval between the current time and the first time is less than or equal to the preset duration, or if the number of times the storage cabinet is opened between the current time and the first time is less than or equal to the first preset number of times, deleting the plurality of frames of image data.

In some embodiments, the method further includes: if a number of the plurality of frames of image data is greater than a second preset quantity, deleting at least one frame of image data with an earliest capturing moment in the plurality of frames of image data, a number of remaining frames of image data being less than or equal to the second preset quantity.

In some embodiments, the "determining, according to a plurality of frames of image data, whether there exists a foreign object in the storage cabinet" includes: in response to closing the storage cabinet, determining, according to the plurality of frames of image data, whether there exists the foreign object in the storage cabinet.

In some embodiments, the "determining that there exists the foreign object in the storage cabinet" includes: in a case where the plurality of frames of image data include a plurality of foreign objects and the plurality of foreign objects are different, if a total number of times a first foreign object has been recognized is greater than a third preset number of times, determining that there exists the foreign object in the storage cabinet. The first foreign object is a foreign object that has been recognized most times in the plurality of foreign objects.

In some embodiments, any two frames of the plurality of frames of image data correspond to different capturing angles.

In some embodiments, the method further includes: after transmitting the alarm information, deleting the plurality of frames of image data.

In an aspect, an apparatus for managing a storage cabinet is provided. The apparatus includes an acquisition unit, a processing unit, and a transmission unit.

The acquisition unit is configured to, in response to opening the storage cabinet, acquire a plurality of frames of image data of inside of the storage cabinet at a current time. The storage cabinet is used to store items.

The processing unit is configured to, if a time interval between the current time and a first time is greater than a preset duration, and a number of times the storage cabinet is opened between the current time and the first time is greater than a first preset number of times, determine, according to the plurality of frames of image data, whether there exists a foreign object in the storage cabinet. The first time is a time when alarm information is transmitted before the current time, and the alarm information is used to alert that the foreign object exists in the storage cabinet.

The transmission unit is configured to, if there exists the foreign object in the storage cabinet, and a number of times existence of the foreign object in the storage cabinet is determined between the current time and the first time is greater than a second preset number of times, transmit the alarm information.

In some embodiments, the acquisition unit is configured to, in a case where an opening angle of a cabinet door of the storage cabinet is within a preset angular range and angular acceleration of the cabinet door is within a preset angular acceleration range, capture images of the inside of the storage cabinet a plurality of times to obtain the plurality of frames of image data.

In some embodiments, the preset angular range is any angular range between 45 degrees and 50 degrees, and the preset angular acceleration range is any angular acceleration range between 0 and 10 radians per second squared.

In some embodiments, the processing unit is configured to, acquire feature information of items in each frame of image data in the plurality of frames of image data; and determine, according to feature information of items in the plurality of frames of image data and a preset feature information library, whether there exists the foreign object in the storage cabinet. The preset feature information library includes feature information of a plurality of items belonging to the storage cabinet, and the foreign object refers to an item that does not belong to the storage cabinet.

In some embodiments, the processing unit is configured to, if there exists an item in all the items included in the plurality of frames of image data, a similarity between feature information of the item and feature information of any one of items in the preset feature information library is less than a first preset value, and a total number of times the item has been recognized is greater than or equal to a first preset numerical value, determine that there exists the foreign object in the storage cabinet; and if similarities between the feature information of all the items included in the plurality of frames of image data and feature information of the items in the preset feature information library are all greater than or equal to the first preset value, or the total number of times the item has been recognized is less than the first preset numerical value, determine that there exists no foreign object in the storage cabinet.

In some embodiments, the processing unit is further configured to, for any frame of image data in the plurality of frames of image data, for example, first image data, in a case where a foreign object feature information library includes feature information of at least one foreign object, if it is determined that there exists a foreign object in the first image data and a similarity between feature information of the foreign object in the first image data and the feature information of the foreign object in the foreign object feature information library is greater than a second preset value, increase a number of times the foreign object has been recognized by a first value to obtain a total number of times the foreign object has been recognized; and if the similarity between the feature information of the foreign object in the first image data and the feature information of the foreign object in the foreign object feature information library is less than or equal to the second preset value, write the feature information of the foreign object in the first image data into the foreign object feature information library. The foreign object feature information library includes feature information of a foreign object recognized in image data whose capturing moment is earlier than the first image data in the plurality of frames of image data.

In some embodiments, the processing unit is further configured to, if the foreign object feature information library is empty, and there exists the foreign object in the first image data, write the feature information of the foreign object in the first image data into the foreign object feature information library.

In some embodiments, the processing unit is further configured to, if the time interval between the current time and the first time is less than or equal to the preset duration, or if the number of times the storage cabinet is opened between the current time and the first time is less than or equal to the first preset number of times, delete the plurality of frames of image data.

In some embodiments, the processing unit is further configured to delete the plurality of frames of image data, after determining, according to the plurality of frames of image data, whether there exists the foreign object in the storage cabinet.

In some embodiments, the processing unit is further configured to, if a number of the plurality of frames of image data is greater than a second preset quantity, delete at least one frame of image data with an earliest capturing moment in the plurality of frames of image data, an amount of image data after deletion being less than or equal to the second preset quantity.

In some embodiments, the processing unit is configured to, in response to closing the storage cabinet, determine, according to the plurality of frames of image data, whether there exists the foreign object in the storage cabinet.

In some embodiments, the processing unit is configured to, in a case where the plurality of frames of image data include a plurality of foreign objects and the plurality of foreign objects are different, if a total number of times a first foreign object has been recognized is greater than a third preset number of times, determine that there exists the foreign object in the storage cabinet. The first foreign object is a foreign object that has been recognized most times in the plurality of foreign objects.

In some embodiments, any two frames of the plurality of frames of image data correspond to different capturing angles.

In yet another aspect, an apparatus for managing a storage cabinet is provided. The apparatus includes: a processor and a communication interface, the communication interface is coupled to the processor, and the processor is used to run a computer program or instructions to implement the method for managing the storage cabinet in the above aspect or any of the above embodiments in the above aspect.

In yet another aspect, a storage cabinet is provided. The storage cabinet includes the above apparatus and a camera. The apparatus is connected to the camera. The apparatus is used to perform the method for managing the storage cabinet in the above aspect or any of the above embodiments in the above aspect. The camera is used to capture the plurality of frames of image data of the inside of the storage cabinet in response to opening the storage cabinet.

In some embodiments, the storage cabinet further includes an angle sensor, the angle sensor being arranged on a side on which the cabinet door is connected to the cabinet body. The angle sensor is used to detect an opening angle of the cabinet door of the storage cabinet.

In some embodiments, the storage cabinet further includes one or more light strips, the one or more light strips being arranged on a side of a door frame of the storage cabinet.

In some embodiments, the camera is a fisheye camera.

In still yet another aspect, a non-transitory computer-readable storage medium is provided. The computer-readable storage medium has stored computer program instructions, and the computer program instructions, when executed on a computer (e.g., the storage cabinet), cause the computer to perform the method for managing the storage cabinet according to any of the above embodiments.

In still yet another aspect, a computer program product is provided. The computer program product includes computer program instructions, and the computer program instructions, when are executed on a computer (e.g., the storage cabinet), cause the computer to perform the method for managing the storage cabinet according to any of the above embodiments.

In still yet another aspect, a computer program is provided. The computer program, when executed by a computer (e.g., the storage cabinet), causes the computer to perform the method for managing the storage cabinet according to any of the above embodiments.

BRIEF DESCRIPTION OF THE DRAWINGS

In order to describe technical solutions in the present disclosure more clearly, the accompanying drawings to be used in some embodiments of the present disclosure will be introduced briefly; obviously, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1:
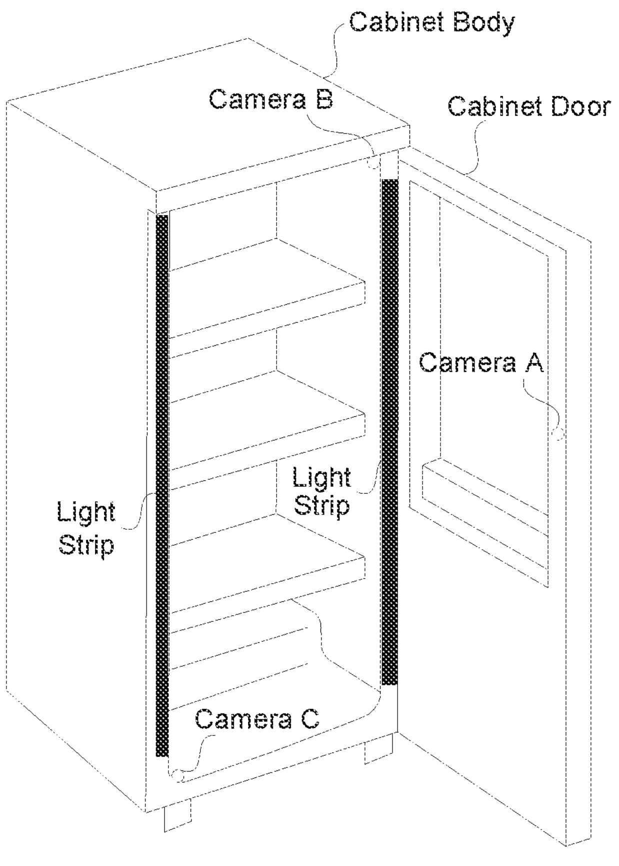
FIG. 1 is a structural diagram of a storage cabinet in accordance with some embodiments.

The technical solutions in some embodiments of the present disclosure will be described clearly and completely with reference to the accompanying drawings; obviously, the described embodiments are merely some but not all of embodiments of the present disclosure. All other embodiments obtained on a basis of the embodiments of the present disclosure by a person of ordinary skill in the art shall be included in the protection scope of the present disclosure.

Unless the context requires otherwise, throughout the specification and claims, the term “comprise” and other forms thereof such as the third-person singular form “comprises” and the present participle form “comprising” are construed as an open and inclusive meaning, i.e., “including, but not limited to.” In the description of the specification, the terms such as “one embodiment,” “some embodiments,” “exemplary embodiments,” “example,” “specific example,” or “some examples” are intended to indicate that specific features, structures, materials, or characteristics related to the embodiment(s) or example(s) are included in at least one embodiment or example of the present disclosure.

Schematic representation of the above terms does not necessarily refer to the same embodiment(s) or example(s). In addition, specific features, structures, materials, or characteristics described herein may be included in any one or more embodiments or examples in any suitable manner.

Hereinafter, the terms "first" and "second" are only used for descriptive purposes and cannot be construed as indicating or implying the relative importance or implicitly indicating the quantity of indicated technical features. Thus, features defined with "first" or "second" may explicitly or implicitly include one or more of the features. In the description of the embodiments of the present disclosure, the term "multiple", "a plurality of" or "the plurality of" means two or more unless otherwise specified.

In the description of some embodiments, the expressions "coupled" and "connected" and derivatives thereof may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the context herein.

The phrase "at least one of A, B, and C" has a same meaning as the phrase "at least one of A, B, or C", and both include the following combinations of A, B, and C: only A, only B, only C, a combination of A and B, a combination of A and C, a combination of B and C, and a combination of A, B, and C.

The phrase "A and/or B" includes the following three combinations: only A, only B, and a combination of A and B.

As used herein, depending on the context, the term "if" is optionally construed as "when", "in a case where", "in response to determining" or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The phase "applicable to" or "configured to" used herein means an open and inclusive language, which does not exclude apparatuses that are applicable to or configured to perform additional tasks or steps.

In addition, the use of the phase "based on" means openness and inclusiveness, since a process, step, calculation or other action that is "based on" one or more of the stated conditions or values may, in practice, be based on additional conditions or values exceeding those stated.

With the widespread use of intelligent cabinets (subsequently referred to as storage cabinets for unified description), the storage cabinets bring convenience to people, but also bring some troubles to staff. The existence of an item in a storage cabinet that does not belong in the storage cabinet will lead to an anomaly in the number of items when staff count the number of the items remaining in the storage cabinet. For example, the sum of items actually removed and items remaining in the storage cabinet is not equal to the total number of items originally in the storage cabinet. For example, there were originally 10 items in the storage cabinet and 6 items were removed. Once there exists a foreign object in the storage cabinet, the number of items remaining in the storage cabinet will exceed 4. This requires the staff to look again for the item that does not belong in the storage cabinet (i.e., the foreign object), wasting time and energy.

In order to remind the staff that there exists a foreign object in the storage cabinet, under normal circumstances, if detecting a foreign object, the storage cabinet will output alarm information to alert that there exists the foreign object in the storage cabinet. For example, the storage cabinet may broadcast the alarm information through voice broadcast; alternatively, the storage cabinet may output the alarm information in the form of a text message; alternatively, the storage cabinet may display the alarm information through a display screen.

However, frequent alarms, false alarms, and missed alarms may occur in the storage cabinet in some cases, which brings inconvenience to the staff.

For example, if the storage cabinet is opened frequently, the storage cabinet will output the alarm information every time it detects the existence of an abnormality. For example, in some time periods, the staff does not need to count the number of items remaining in the storage cabinet, but the storage cabinet will still output the alarm information, which increases the workload of the staff.

As another example, if recognizing an item originally in the storage cabinet as a foreign object, the storage cabinet will also output the alarm information, which causes the staff to spend time and energy searching for the foreign object.

As another example, if recognizing a foreign object as an item in the storage cabinet, the storage cabinet will not output the alarm information. As a result, the number of items remaining in the storage cabinet will be inconsistent with the number of counted items, resulting in an error in the counted amount.

In light of this, embodiments of the present disclosure provide a method for managing a storage cabinet. If the number of times the storage cabinet is opened exceeds a first preset number of times, and a time interval between a current time and the last time the alarm information is output exceeds a preset duration, it is determined whether there exists a foreign object in the storage cabinet according to the plurality of frames of image data; and if there exists the foreign object in the storage cabinet and the number of times existence of the foreign object in the storage cabinet is determined in a period of time is greater than a second preset number of times, where the period of time is between the last time the alarm information is output and the current time, the alarm information is output. In this way, if the storage cabinet is opened frequently, the current time from the last alarm time is relatively long, and the number of times the existence of the foreign object in the storage cabinet is determined is relatively large, the storage cabinet outputs the alarm information. As a result, while reminding the management personnel to clean up the foreign object in the storage cabinet, the storage cabinet does not have a problem of frequent alarms. For example, in some cases, storage cabinets have a recognition abnormality (e.g., incorrectly recognizing an item belonging to a storage cabinet as a foreign object), so that the storage cabinet may alarm frequently, increasing the workload of the management personnel. In the embodiments of the present disclosure, the storage cabinet carries out a comprehensive analysis according to a recognition result of the image data captured when the door is opened multiple times, and determines whether to give an alarm according to the analysis result. In an aspect, the phenomenon of recognition abnormality is reduced, avoiding the problem of frequent alarms; in another aspect, the workload of the management personnel is reduced due to the reduction in the number of alarms.

In addition, in the embodiments of the present disclosure, in a case of determining whether there exists a foreign object in the storage cabinet, the storage cabinet detects whether there exists the foreign object in the storage cabinet according to the plurality of frames of image data of the storage cabinet, which increases the accuracy of foreign object recognition and reduces probability of false alarms and missed alarms.

Embodiments of the present disclosure will be described in detail below with reference to the accompanying drawings.

As shown in FIG. 1, FIG. 1 shows a storage cabinet provided in the embodiments of the present disclosure. The storage cabinet may include a cabinet body and a cabinet door. The cabinet body is connected to the cabinet door.

Here, the cabinet body is used for placing items. The cabinet door is provided thereon with a camera A. The orientation of the camera A is a direction of the cabinet body. The camera A is used to capture image data of the inside of the cabinet body.

In a possible implementation, the camera A may be arranged at an edge position of the cabinet door farthest from a connection between the cabinet door and the cabinet body. In this way, it may be guaranteed that the camera A can capture information of items in the cabinet body. Of course, the camera A may also be arranged at other positions, for example, it may also be arranged at the edge of the cabinet body.

In an example, in order to ensure that the camera A can capture all the items in the storage cabinet, the camera A may be a fisheye camera. The fisheye camera has a relatively large capturing range, which can cover the entire interior of the storage cabinet.

Figure 2:
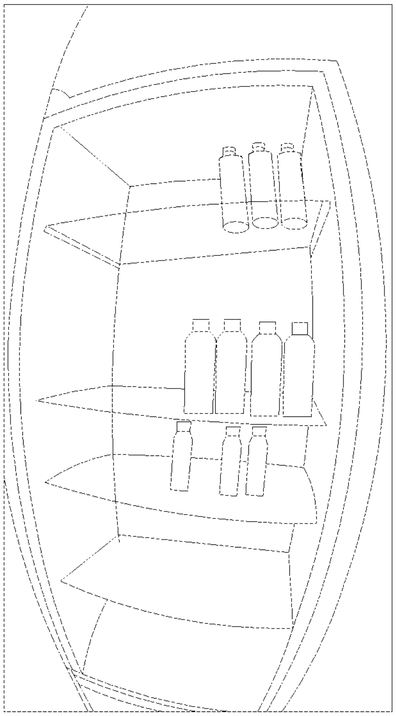
FIG. 2 is a schematic diagram showing image data in accordance with some embodiments.

For example, as shown in FIG. 2, FIG. 2 is a schematic diagram showing image data captured by the camera A provided in the embodiments of the present disclosure. It can be seen from the image data in FIG. 2 that the camera A can capture the image data of all the items in the storage cabinet.

In another example, in order to make the image data captured by the camera clearer, as shown in FIG. 1, both sides of the cabinet body of the storage cabinet may be provided thereon with light strips. The light strips of the storage cabinet can be turned on in response to the opening of the cabinet door, so that the brightness inside the storage cabinet may be increased, making the image data captured by the camera clearer.

Of course, the storage cabinet may also be provided with more cameras, for example, the storage cabinet may further be provided with a camera B and a camera C. The camera B and the camera C can be used to assist the camera A. For example, if image data in the storage cabinet cannot be obtained since the camera A breaks down or the lens of camera A is blocked, the storage cabinet can capture the image data in the storage cabinet through the camera B and/or camera C.

Figure 3:
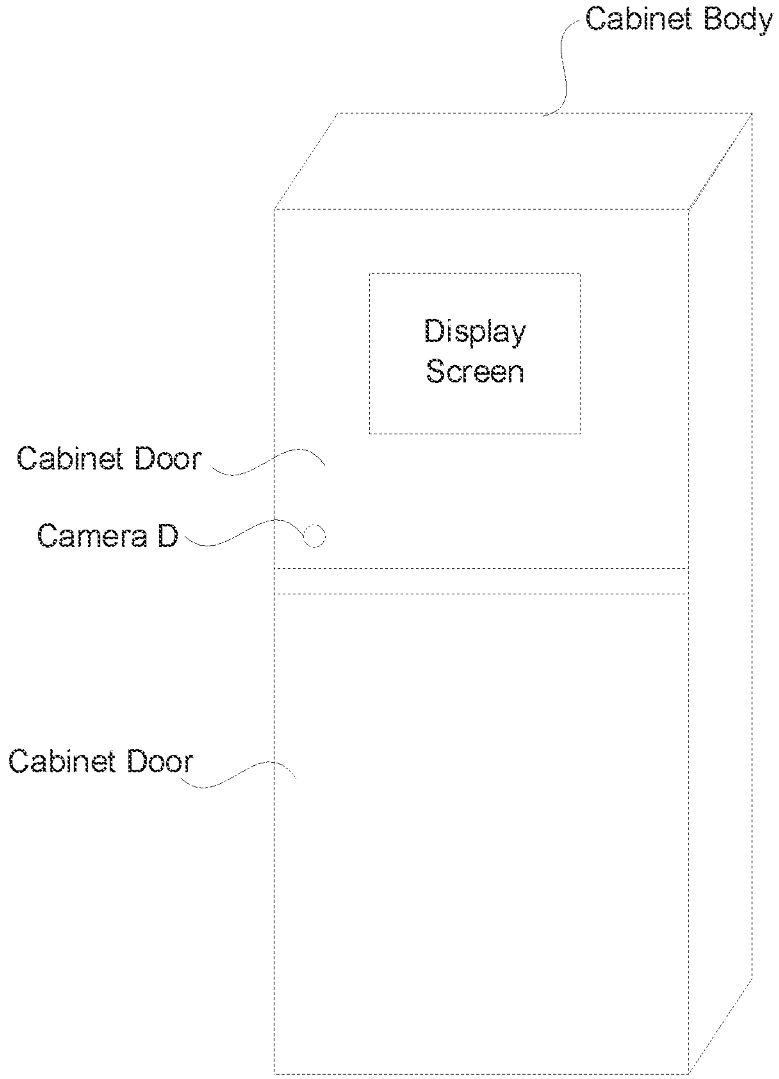
FIG. 3 is a structural diagram of a storage cabinet in accordance with some embodiments.

In yet another example, as shown in FIG. 3, the storage cabinet may also be provided with a camera D. The camera D is arranged on the outside of the cabinet door, and its orientation is consistent with the opening direction of the storage cabinet. The camera D can be used to capture image data of a person in front of the storage cabinet. The storage cabinet can detect whether the person has the authority to open the storage cabinet according to the image data captured by the camera D. If determining that the person has the authority to open the storage cabinet, the storage cabinet may not output warning information in response to an operation of opening the storage cabinet by this person. If determining that the person does not have the authority to open the storage cabinet, the storage cabinet may output the warning information in response to the operation of opening the storage cabinet by this person.

In yet another possible implementation, the storage cabinet may also be provided with a management apparatus, and the management apparatus is connected to the camera, for example, through a system bus. The management apparatus can be used to perform image recognition on the image data captured by the camera to determine whether there exists a foreign object in the image data. For a specific recognition process, reference may be made to the following embodiments.

In some scenarios, the management apparatus may be a card board, a processor (e.g., a central processing unit (CPU)), or the like.

In yet another possible implementation, as shown in FIG. 3, the storage cabinet may further be provided with a display screen. The display screen may be arranged on the outside of the cabinet door. In this way, the storage cabinet can output alarm information through the display screen.

In yet another possible implementation, the storage cabinet provided in embodiments of the present disclosure may also be provided with a voice playing device (such as a stereo and a loudspeaker). In this way, the storage cabinet can output alarm information through the voice playing device. Of course, the storage cabinet may also display other voice information through the voice playing device, for example, may also play "WELCOME TO USE THE STORAGE CABINET", "PLEASE CLOSE THE CABINET DOOR", "INSUFFICIENT NUMBER OF ITEMS, PLEASE REPLENISH ITEMS IN TIME" or the like. In the embodiments of the present disclosure, the alarm information and other voice information may be pre-configured for the storage cabinet.

In yet another possible implementation, the storage cabinet provided in the embodiments of the present disclosure may further be provided with one or more sensors, which can be used to detect the state of the cabinet door (e.g., opened or closed). For example, the sensor may be arranged on a side on which the cabinet door is connected to the cabinet body.

In an example, the one or more sensors may include a distance sensor. If the distance sensor detects that a distance between the cabinet door and the cabinet body is greater than a preset distance, it means that the storage cabinet is in an opened state; and if the distance sensor detects that the distance between the cabinet door and the cabinet body is less than or equal to the preset distance, it means that the storage cabinet is in a closed state.

Further, the storage cabinet may further be provided with a counter, which can be used to count the number of times the storage cabinet is opened. For example, state information of the cabinet door detected by the one or more sensors includes: being in the opened state during a first time period, and being in the closed state during a second time period adjacent to the first time period and after the first time period. In this case, the storage cabinet can control the counter to increase a first value (e.g., 1). In this way, according to the status information of the cabinet door detected by the one or more sensors, the storage cabinet can continue to determine the number of times the storage cabinet is opened thereafter, and count the number of times the storage cabinet is opened through the counter.

It will be noted that the storage cabinet can also initialize the counter (e.g., initialize the value of the counter to 0).

In another example, the storage cabinet may also be provided with a timer, which can be used for timing. For example, the timer may be used to record the time of each alarm, each time the cabinet door is opened, etc.

In yet another example, the one or more sensors may further include an angle sensor, which can be used to detect an opening angle of the cabinet door. According to the opening angle of the cabinet door at multiple times, the storage cabinet can determine the angular acceleration of the cabinet door in the opening process.

For example, in the opening process of the storage cabinet, the opening angle of the cabinet door at T1 time is $\theta_1$, the opening angle of the cabinet door at T2 time after T1 time is $\theta_2$, and the opening angle of the cabinet door at T3 time after T2 time is $\theta_3$, then an angular velocity of the cabinet door of the storage cabinet from the time T1 to the time T2 is $\alpha 1$, and $\alpha 1=(\theta_2-\theta_1)/(T2-T1)$, and an angular velocity of the cabinet door of the storage cabinet from the time T2 to the time T3 is $\alpha 2$, and $\alpha 2=(\theta_3-\theta_2)/(T3-T2)$. Based on the two angular velocities, the angular acceleration of the cabinet door of the storage cabinet is equal to $(\alpha 2-\alpha 1)/(T3-T1)$.

If the angular acceleration of the cabinet door of the storage cabinet is too large, it means that a rotation speed of the cabinet door of the storage cabinet is too high. And if the cabinet door of the storage cabinet is rotated too fast, the image data captured by the camera may be unclear. If the angular acceleration of the cabinet door of the storage cabinet is too small (e.g., less than 0), it means that the rotation speed of the cabinet door of the storage cabinet is too low. And if the cabinet door of the storage cabinet is rotated too slowly, pieces of image data captured by the camera may be the same or similar. Therefore, based on the angular acceleration, if detecting that the angular acceleration of the cabinet door is within a preset angular acceleration range, the storage cabinet can control the camera to start taking photographs, thereby improving the quality of the image data and reducing energy consumption caused by too many captured images.

It will be noted that, the sensor may continuously detect the state of the storage cabinet in the embodiments of the present disclosure. That is, when the storage cabinet is in the closed state, the sensor can detect the state of the storage cabinet. When the storage cabinet is in the opened state, the sensor can detect the state of the storage cabinet.

It will be noted that, the storage cabinet in the embodiments of the present disclosure may be an unmanned vending machine, a temperature control device (such as a refrigerator, or a freezer), and of course it may also be other containers, which are not limited.

In yet another possible implementation, the storage cabinet may also be provided with a communication module. The communication module may be connected to a management apparatus, or may be used to transmit alarm information to a terminal of a staff member.

Here, the management apparatus can be used to manage the storage cabinet. For example, the management apparatus may be informed from the storage cabinet of information such as the number of the remaining items. The management apparatus may be a server or a computer. The terminal may include a cell phone, a tablet computer, a personal computer, or the like.

The method for managing a storage cabinet provided by the embodiments of the present disclosure will be described below in conjunction with the storage cabinet shown in FIG. 1.

It will be noted that an execution subject of the embodiments of the present disclosure may be a storage cabinet or a device in the storage cabinet, such as a chip or system-on-a-chip of the storage cabinet. The method for managing the storage cabinet provided by the embodiments of the present disclosure will be described below by taking the storage cabinet serving as the execution subject as an example.

Figure 4:
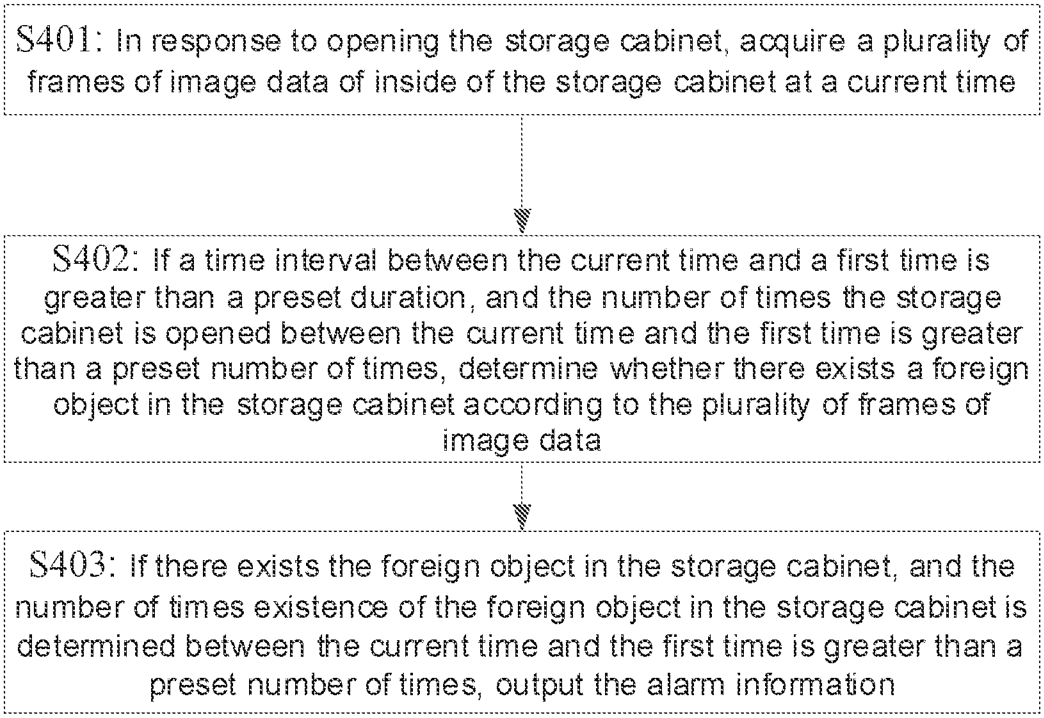
FIG. 4 is a flowchart of a method for managing a storage cabinet in accordance with some embodiments.

As shown in FIG. 4, embodiments of the present disclosure provide the method for managing the storage cabinet, which includes steps S401 to S403.

In S401, in response to opening the storage cabinet, a plurality of frames of image data of inside of the storage cabinet at a current time are acquired.

Here, the current time may refer to a time between a moment the storage cabinet is opened and a moment the storage cabinet is closed.

In an example, the state of the storage cabinet may be determined according to the state information detected by the sensor.

For example, if the state information detected by the sensor indicates that the storage cabinet is in an opened state at the current time, and the storage cabinet is in a closed state at a first time before the current time, it means that the storage cabinet is opened at the current time. In this case, the storage cabinet captures a plurality of frames of image data of the inside of the storage cabinet through the camera.

As another example, if the state information detected by the sensor indicates that the storage cabinet is in the closed state at the current time, and the storage cabinet is in the opened state at the first time before the current time, it means that the storage cabinet is closed at the current time. In this case, the storage cabinet performs image recognition on the plurality of frames of image data captured by the camera to determine whether there exists a foreign object in the storage cabinet. For the specific process, reference may be made to the subsequent description, and details are not described here.

In a possible implementation, in order to ensure the quality of the image data captured by the camera, in a case where the cabinet door has an opening angle within a preset angular range and has angular acceleration within a preset angular acceleration range, the storage cabinet starts to capture image data of the inside of the storage cabinet through the camera.

Here, the preset angle range and the preset angular acceleration range can be set as needed. For example, the preset angular range is any range between 45 degrees and 50 degrees, such as a range between 45 degrees and 50 degrees, or a range between 46 degrees and 49 degrees, which is not limited. For example, the preset angular acceleration range is any range between 0 and 10 radians per second squared, such as a range between 0 and 10 radians per second squared, or a range between 1 and 5 radians per second squared, which is not limited.

Based on this implementation, the problem of the camera not being able to take photographs of all the items located in the storage cabinet due to the opening angle of the storage cabinet being too small (e.g., at the moment when the storage cabinet has just been opened) may be avoided. In a case where the opening angle of the storage cabinet is between 45 degrees and 50 degrees, the camera can start capturing image data. Since the camera is able to capture all the items in the storage cabinet if the opening angle of the storage cabinet is between 45 degrees and 50 degrees, the availability of the image data may be improved, and the number of times the camera takes photographs may also be reduced, thereby reducing the power consumption of the storage cabinet.

In addition, if the cabinet door of the storage cabinet is rotated too fast, the image data captured by the camera may be blurred, which is not conducive to subsequent image recognition. Therefore, the camera captures the image data only when the angular acceleration of the cabinet door of the storage cabinet is within the preset angular acceleration range, ensuring the clarity of the image data. For example, the angular acceleration of the cabinet door is between 0 and 10 radians per second squared, in this case, the cabinet door of the storage cabinet will be not rotated too fast or too slowly, so as to avoid blurring of the captured image data as well as capturing too many repetitive image data.

In S402, if a time interval between the current time and a first time is greater than a preset duration, and the number of times the storage cabinet is opened between the current time and the first time is greater than a preset number of times (i.e., the first preset number of times), it is determined whether there exists a foreign object in the storage cabinet according to the plurality of frames of image data.

Here, the first time is a time when the storage cabinet transmits alarm information before the current time. The foreign object is an item that does not belong in the storage cabinet. The preset duration and the preset number of times can be set as needed. For example, the preset duration may be 1 hour, 2 hours, or the like, and the preset number of times may be 10 times, 20 times, 30 times, or the like, which are not limited.

In an example, the storage cabinet may determine the time interval between the current time and the last time the alarm information is transmitted according to the time recorded by the timer, and determine the number of opening times between the current time and the last time the alarm information is transmitted according to the number of opening times counted by the counter. If the time interval exceeds the preset duration and the number of opening times exceeds the preset number of times, the storage cabinet performs a recognition process of foreign objects. The recognition process of the foreign objects may include a process of determining whether there exists a foreign object and a process of determining the number of the foreign objects. For the specific process, reference may be made to the subsequent description, and details are not described here.

In another example, the storage cabinet may further be provided with a counting algorithm and a timing algorithm, so that the storage cabinet can count the number of opening times by the counting algorithm, and count the duration by the timing algorithm.

In a possible implementation, in order to reduce the load of the management apparatus of the storage cabinet, in response to closing the storage cabinet, the storage cabinet determines whether there exists the foreign object in the storage cabinet according to the plurality of frames of image data.

In yet another possible implementation, in order to process the image data in time, the storage cabinet may perform image recognition on a single frame of image data upon acquisition of this frame of image data to determine whether there exists a foreign object in this frame of image data. In this way, the storage cabinet may perform dynamic recognition on the image data, avoiding the problem that the storage cabinet is opened again before the image data acquired at the current time is recognized, resulting in an inaccurate recognition result of the foreign object.

In S403, if there exists the foreign object in the storage cabinet, and the number of times existence of the foreign object in the storage cabinet is determined between the current time and the first time is greater than a preset number of times (i.e., the second preset number of times), the alarm information is output.

Here, the number of times existence of the foreign object in the storage cabinet is determined may also be described as the number of foreign object intrusions into the storage cabinet. The number of times existence of the foreign object in the storage cabinet is determined between the current time and the first time refers to the number of times existence of the foreign object in the storage cabinet is determined during a process of opening the door multiple times between the current time and the first time. The preset number of times can be set as needed. For example, the preset number of times may be ½ of the number of opening times, of course, and it may also be other values, which is not limited.

In an example, the preset number of times is 3, and the number of times the storage cabinet is opened in the time period between the current time and the first time is 5, and if there are 3 times that it is determined that there exists the foreign object in the storage cabinet, the alarm information may be output.

Based on the technical solution in FIG. 4, only if the number of times the storage cabinet is opened exceeds the preset number of times, and the time interval between the current time and the last time the alarm information is output exceeds the preset duration, the storage cabinet determines whether there exists a foreign object in the storage cabinet according to the plurality of frames of image data acquired. And only if the number of times existence of the foreign object in the storage cabinet is determined between the current time and the last time the alarm information is output exceeds the preset number, the storage cabinet outputs the alarm information, which reduces the number of alarms. Moreover, in the embodiments of the present disclosure, the storage cabinet detects whether there is the foreign object in the storage cabinet according to the plurality of frames of images, so the accuracy of foreign object detection may be improved and the probability of misjudgment may be reduced.

In some embodiments, in combination with the preset angle range and the preset angular acceleration range in S401 above, when the cabinet door is rotated and its opening angle varies from 0 degrees to 45 degrees, the storage cabinet starts to capture images data of the inside of the storage cabinet through the camera A until the opening angle of the cabinet door of the storage cabinet reaches 50 degrees. When the opening angle of the storage cabinet exceeds 50 degrees, the storage cabinet can control the camera A to stop capturing image data of the inside of the storage cabinet.

Further, in order to avoid the situation that there exists a foreign object in the storage cabinet during a process of closing the storage cabinet, and there exists no foreign object in the storage cabinet during a process of opening the cabinet door, which will lead to false results of subsequent foreign object detection, in the embodiments of the present disclosure, during the process of closing the cabinet door of the storage cabinet, the storage cabinet may continue to capture image data of the inside of the storage cabinet through the camera A. The process of opening the cabinet door may refer to a process in which the opening angle of the cabinet door is continuously increased; while the process of closing the cabinet door refers to a process in which the opening angle of the cabinet door of the storage cabinet is continuously reduced.

Here, the storage cabinet can determine the state of the cabinet door according to the variation of the opening angle of the cabinet door detected by the angle sensor.

With reference to the above example, the opening angle of the cabinet door at time T3 is $\theta_3$, and the opening angle at time T4 is $\theta_4$, where the time T4 is after the time T3. If $\theta_3$ is greater than $\theta_4$, it means that the cabinet door is in the process of closing.

In an example, if the opening angle of the cabinet door decreases from 90 degrees to 50 degrees, the storage cabinet may continue to capture image data of the inside of the storage cabinet through the camera until the opening angle decreases to 45 degrees. If the opening angle of the cabinet door is less than 45 degrees, the storage cabinet controls the camera A to stop capturing the image data of the inside of the storage cabinet.

It will be noted that if the angular acceleration of the cabinet door exceeds the preset angular acceleration range, it means that the cabinet door is moving too fast, which may result in low clarity of the captured image data, resulting in the low accuracy of subsequent image recognition.

Based on these embodiments, it is possible to avoid the problem that a foreign object appears during the process of closing the cabinet door, resulting in a missed alarm.

In some other embodiments, in order to reduce the time spent in subsequent image data recognition, in the embodiments of the present disclosure, the storage cabinet can continuously update the captured image data during the process of capturing the image data of the storage cabinet, so that the number of frames of image data used for the foreign object recognition does not exceed a second preset quantity.

Here, the second preset quantity can be set according to needs. For example, the second preset quantity may be any value among 5 to 15. The second preset quantity may also be determined according to the performance of the camera, the performance of the processor, and the performance of the image recognition algorithm. For example, the higher the performance of the camera, the greater the value of the second preset quantity. As another example, the better the performance of the processor, the greater the value of the second preset quantity. As another example, the higher the recognition efficiency of the image recognition algorithm, the greater the value of the second preset quantity.

In an example, if the number of frames of captured image data is greater than the second preset quantity, the storage cabinet may delete part of the image data in the plurality of frames of image data, so that the number of frames of image data is less than or equal to the second preset quantity.

In a scenario, if the number of frames of image data captured by the camera exceeds the second preset quantity, the storage cabinet can control the camera to stop capturing image data, or the storage cabinet can also continue to capture image data through the camera and update the plurality of frames of image data.

Here, a process of updating the plurality of frames of image data may refer to a process in which the storage cabinet replaces image data with the earliest capturing moment in the plurality of frames of image data with image data captured by the camera with the latest capturing moment.

Figure 5:
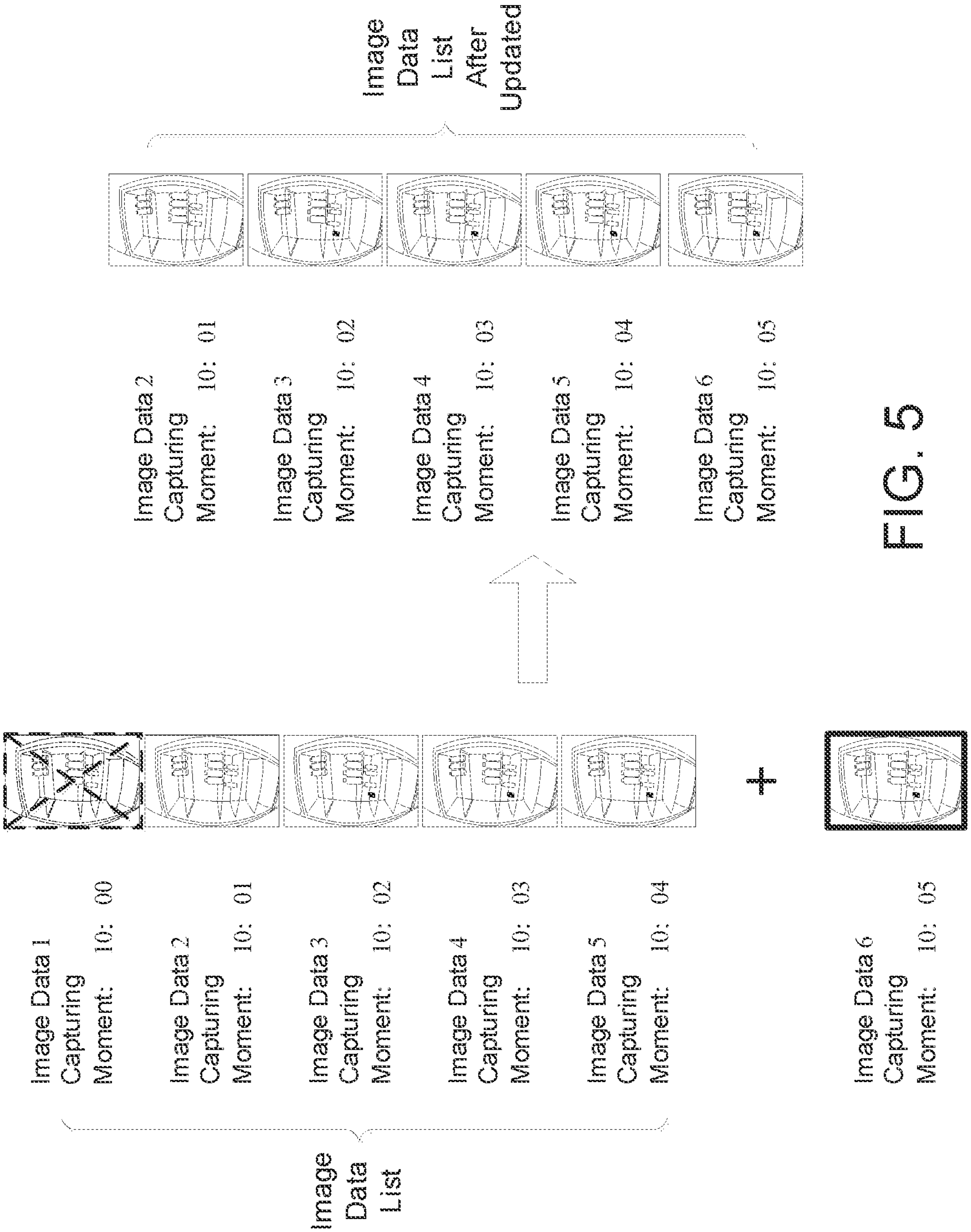
FIG. 5 is a schematic diagram showing updating an image data list in accordance with some embodiments.

For example, the second preset quantity is 5, and as shown in FIG. 5, the camera has captured 5 frames of image data (image data 1 to image data 5, respectively) between the start of photographing and the first time. An image data list is obtained by sorting the 5 frames of image data in chronological order of when they are captured. The arrangement sequence in the image data list is determined according to the capturing moment. For example, in the image data list, the image data 1 is image data with the earliest capturing moment among the 5 frames of image data, and the image data 5 is image data with the latest capturing moment among the 5 frames of image data.

Afterward, the storage cabinet continues to capture image data of the inside of the storage cabinet through the camera. For example, as shown in FIG. 5, after the first time, another frame of image data (may be marked as image data 6) is captured, then the storage cabinet deletes the image data 1, and writes the image data 6 into the image data list, so as to obtain an updated image data list. Similarly, if the storage cabinet continues to capture image data through the camera subsequently, the storage cabinet may continue to update the image data list until the storage cabinet controls the camera to stop photographing.

Based on these embodiments, it may not only ensure that the acquired plurality of frames of image data are the latest image data, but also avoid the situation in which the recognition speed is too slow during the subsequent image recognition process, resulting in the next time the cabinet door of the storage cabinet is opened without having finished recognizing the image data, which results in the incorrect detection of the foreign object and causes inconvenience to the management of the staff.

In some embodiments, in order to ensure that information of items located in the storage cabinet is captured as much as possible, angles corresponding to any two frames of image data in the plurality of frames of image data are different. Among the plurality of frames of image data, a difference between angles corresponding to two adjacent frames of image data at the capturing moment may be a preset angle. The preset angle can be set as needed. For example, the preset angle may be 1 degree to 2 degrees.

For example, after controlling the camera to capture image data of the inside of the storage cabinet, the storage cabinet can acquire a capturing angle corresponding to the image data according to the angle sensor. In this way, the storage cabinet can acquire a capturing angle corresponding to each frame of image data in the plurality of frames of image data.

In a subsequent process of the storage cabinet continuing to photographing through the camera, it may be compared whether a capturing angle corresponding to a captured frame of image data is the same as that of the plurality of frames of image data. If there exist multiple frames of image data with the same capturing angle, the storage cabinet deletes this frame of image data, or replaces a corresponding frame of image data with this frame of image data with.

In an example, during a process of rotating the cabinet door of the storage cabinet, the storage cabinet captures image data of the inside of the storage cabinet through the camera. When the cabinet door stops rotating, the storage cabinet controls the camera to stop capturing the image data of the inside of the storage cabinet.

Here, the storage cabinet can determine whether the cabinet door is in a rotating state according to the variation of the opening angle of the cabinet door detected by the angle sensor. For example, if the angle sensor detects that a plurality of consecutive angles of the opened cabinet door remain constant, it indicates that the cabinet door has stopped rotating; and if the angle sensor detects that the plurality of consecutive angles of the opened cabinet door gradually increases or gradually decreases, it indicates that the cabinet door is rotating. In this way, the storage cabinet may accurately determine whether the cabinet door is rotating or not.

In a possible scenario, during a time period from T5 to T6, as detecting that the opening angle of the cabinet door of the storage cabinet is continuously increasing, the storage cabinet may capture image data of the inside of the storage cabinet through the camera. During a time period from T6 to T7, as detecting that the opening angle of the door remains constant, the storage cabinet may control the camera to continue capturing image data of the inside of the storage cabinet. During a time period from T7 to T8, as detecting that the opening angle of the cabinet door of the storage cabinet is continuously decreasing, the storage cabinet may continue to capture image data of the inside of the storage cabinet through the camera.

In an example, in combination with the above angle range, if detecting that the opening angle of the cabinet door exceeds the preset angle range during the time period from T7 to T8, the storage cabinet may control the camera to stop capturing image data of the inside of the storage cabinet.

In another example, in combination with the above angular acceleration range, if detecting that the angular acceleration of the cabinet door exceeds the preset angular acceleration range during the time period from T7 to T8, the storage cabinet may control the camera to stop capturing image data of the inside of the storage cabinet.

In yet another example, in combination with the above number of the plurality of frames of image data not exceeding the second preset quantity, if the number of frames of image data captured by the camera of the storage cabinet reaches the second preset quantity before the time period from T7 to T8, the storage cabinet may control the camera to stop capturing image data of the inside of the storage cabinet, alternatively, the storage cabinet may control the camera to continue capturing image data of the inside of the storage cabinet, and update the plurality of frames of image data captured before the time period from T7 to T8.

Further, the storage cabinet may determine whether to update the plurality of frames of image data according to a capturing angle of image data. For example, the storage cabinet captures a frame of image data through the camera again, and then compares a capturing angle of this frame of image data with a capturing angle of each frame of image data in the plurality of frames of image data. If in the plurality of frames of image data, there exists a frame of image data with the same capturing angle as this frame of image data, the storage cabinet may not update the plurality of frames of image data. If in the plurality of frames of image data, there exists no frame of image data with the same capturing angle as this frame of image data, the storage cabinet may update the plurality of frames of image data.

Based on these embodiments, since the storage cabinet does not acquire too much image data, the speed of recognizing the foreign object may be improved.

Figure 6:
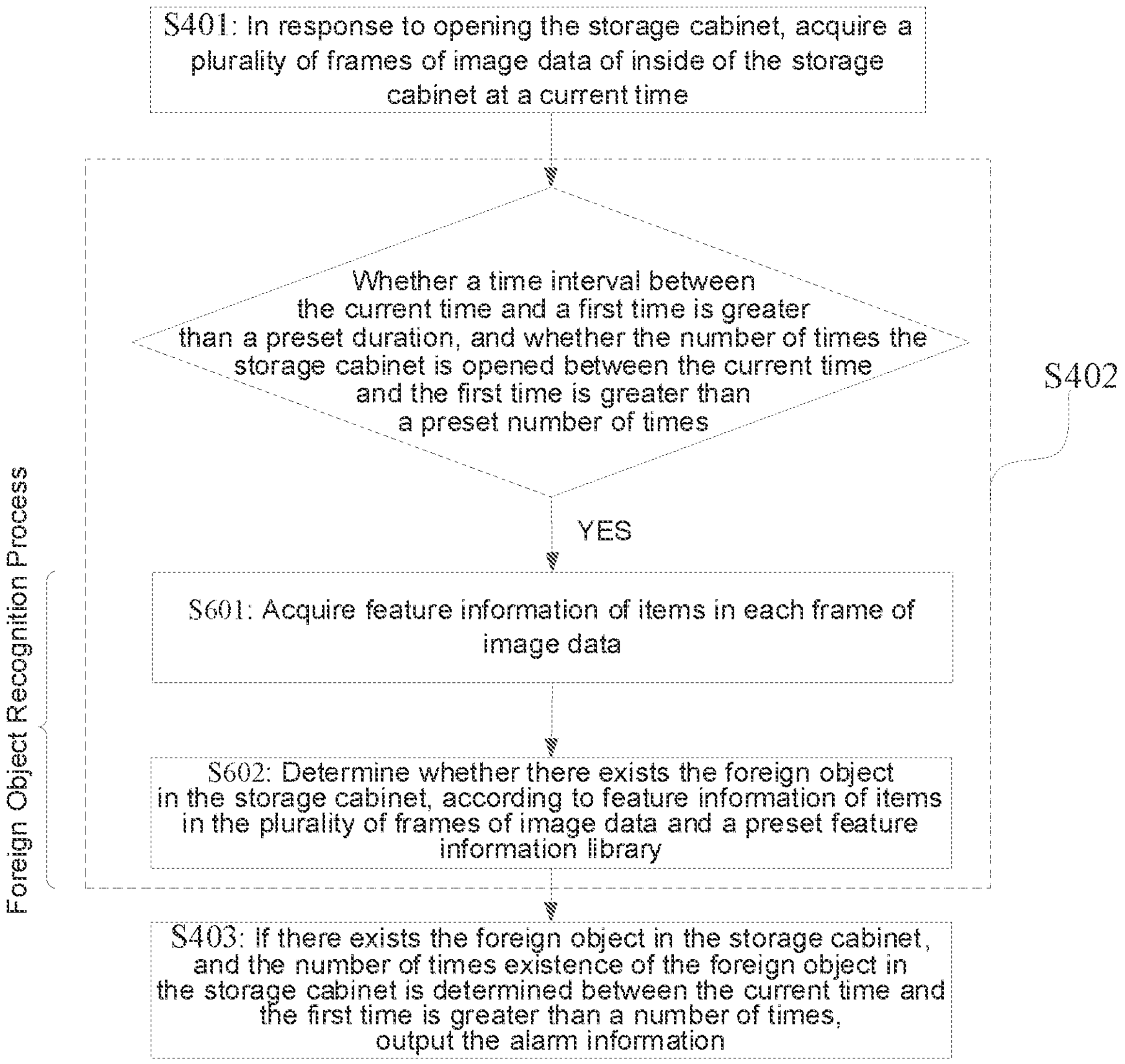
FIG. 6 is a flowchart of a method for managing a storage cabinet in accordance with some embodiments.

In some other embodiments, as shown in FIG. 6, in S402, the foreign object recognition process may include steps S601 and S602.

In S601, feature information of items in each frame of image data is acquired.

Here, the feature information of the items may be feature information of all items in the image data.

In a possible implementation, the storage cabinet may be provided with an item recognition model, and the item recognition model can be used to recognize feature information of an item.

For example, the storage cabinet may input the plurality of frames of image data into the item recognition model to obtain feature information of the item in each frame of image data.

It will be noted that the item recognition model may be obtained by training feature information of a plurality of samples according to a preset algorithm. The plurality of samples may include items belonging to the storage cabinet and also include items not belonging to the storage cabinet. The preset algorithm may be a neural network algorithm or a deep learning algorithm, which is not limited.

Further, in order to avoid that feature information of an item cannot be recognized due to the item being blocked, the above plurality of samples may further include feature information of a partial item (or local item). In this way, if a portion of the item in the image data is blocked, the storage cabinet can also obtain the feature information of the item in a case of recognizing the image data by the item recognition model.

In yet another example, the storage cabinet may also acquire the feature information of the items in the image data by means of selection detection. Specifically, reference may be made to the description of the embodiments in FIG. 7 below.

In S602, it is determined whether there exists the foreign object in the storage cabinet, according to feature information of items in the plurality of frames of image data and a preset feature information library.

Here, the preset feature information library includes feature information of a plurality of items belonging to the storage cabinet. The preset feature information library may be pre-configured for the storage cabinet. For example, the preset feature information library may be input to the storage cabinet by the staff; alternatively, the preset feature information library may be obtained by the storage cabinet from another device, for example, may be obtained by the storage cabinet from the management apparatus, which is not limited.

In a possible implementation, for each frame of image data, after recognizing an item in the frame of image data, the storage cabinet calculates a similarity between the item and the items in the preset feature information library. For example, a similarity between feature information of the item and each piece of feature information in the preset feature information library may be calculated. The similarity may be a cosine similarity. For the calculation method of the cosine similarity, reference may be made to the prior art, which will not be repeated here.

For example, for each item included in the plurality of frames of image data, the storage cabinet may calculate a similarity between feature information of this item and each piece of feature information in the preset feature information library. If in the preset feature information library, there exists feature information whose similarity with the feature information of this item is greater than or equal to a preset value (i.e., a first preset value), the storage cabinet may determine that this item belongs to the storage cabinet. If a similarity between any feature information in the preset feature information library and the feature information of this item is less than the preset value, the storage cabinet can determine that this item is a foreign object.

Further, during each door opening process, the storage cabinet may perform image recognition on a plurality of frames of image data acquired during this door opening process, and determine recognized foreign object(s) and the number of the foreign object(s) in each frame of image data. If the total number of times the foreign object(s) are recognized in the plurality of frames of image data is greater than a first preset numerical value, it is determined that there exist the foreign object(s) in the storage cabinet or that the storage cabinet is intruded by the foreign objects.

Here, the first preset numerical value can be set as needed. For example, the first preset numerical value may be half (½) of the number of the plurality of frames of image data. Of course, the first preset numerical value may also be other values, which is not limited. The total number of times the foreign object(s) are recognized may refer to the total number of times a first foreign object among multiple different foreign objects included in the plurality of frames of image data is recognized, and the first foreign object refers to among the multiple foreign objects, a foreign object that is recognized the most times; alternatively, the total number of times the foreign object(s) are recognized may refer to the total number of times all the foreign objects in the plurality of frames of image data are recognized; alternatively, the total number of times the foreign object(s) are recognized may refer to the number of frames of image data in the plurality of frames of image data in which the foreign object(s) are recognized; alternatively, the total number of times the foreign object(s) are recognized may refer to the total number of foreign object(s) recognized during a process of openings the storage cabinet multiple times between the current time and the first time.

It will be noted that different foreign objects refer to foreign objects with different pieces of feature information. Feature information of an item can be used to characterize this item. For example, feature information of an item may include the shape, color, pattern, etc. of the item. In the embodiments of the present disclosure, since different items have different angles/distances with the camera, pieces of feature information of same items at different locations may also be different in the image data. For example, feature information of an item is the shape of the item, and same items at different locations may have different shapes displayed in the image data.

For the total number of times the foreign object(s) are recognized, the above four cases will be described respectively below.

In case 1, the total number of times the foreign object(s) are recognized refers to the total number of times a first foreign object among multiple different foreign objects included in the plurality of frames of image data is recognized.

Here, the storage cabinet can separately count the total number of times each foreign object has been recognized in the above foreign object recognition process, and determine whether to output the alarm information according to the total number of times the first foreign object has been recognized. For example, if the total number of times the first foreign object has been recognized is greater than a third preset number of times, the alarm information is output. The third preset number of times can be set as needed and is not limited.

For example, the number of the plurality of frames of image data is 5 (image data 1 to image data 5, respectively). Here, in each of the image data 1 to the image data 5, each foreign object that has been recognized and the number of times the foreign object has been recognized may be shown in following Table 1.

TABLE 1

| Image Data | Foreign object that is recognized and the number of times the foreign object is recognized | | |
|---|---|---|---|
| | Foreign object 1 | Foreign object 2 | Foreign object 3 |
| Image Data 1 | 1 | 0 | 0 |
| Image Data 2 | 1 | 1 | 0 |
| Image Data 3 | 1 | 1 | 0 |
| Image Data 4 | 1 | 1 | 1 |
| Image Data 5 | 1 | 1 | 1 |
| Total number of times | 5 | 4 | 2 |

It will be noted that the numerical values in Table 1 are only exemplary, and the foreign object recognition process may also include more or less image data and more or less number of times the foreign object has been recognized.

In combination with the above Table 1, if the first preset numerical value is 5, since the total number of times the foreign object 1 has been recognized is equal to 5, the storage cabinet outputs the alarm information. If the first preset numerical value is 10, since the total number of times the foreign object 1 has been recognized is less than 10, the storage cabinet does not output the alarm information; in this case, the storage cabinet may delete the above-mentioned plurality of frames of image data.

In an example, the storage cabinet can save the value of the counter, and if the number of foreign objects included in a plurality of frames of image data in the storage cabinet next opening time exceeds a first preset quantity, the storage cabinet outputs the alarm information and initializes the counter. That is to say, the storage cabinet may start to execute the above S401 to S403 again.

In case 2, the total number of times the foreign object(s) are recognized refers to the total number of times all the foreign objects in the plurality of frames of image data are recognized.

Here, for the plurality of frames of image data obtained by the storage cabinet, the storage cabinet can count the number of foreign object(s) recognized in each frame of image data, so as to determine the total number of times all the foreign objects in the plurality of frames of image data have been recognized according to the statistical result.

For example, if the number of the plurality of frames of image data is 5, and the total number of times a foreign object has been recognized in each frame of image data of the 5 frames of image data is 1, 1, 1, 1, 1 respectively, then the total number of times the foreign object(s) have been recognized is 5, i.e., 1+1+1+1+1=5.

In case 3, the total number of times the foreign object(s) are recognized refers to the number of frames of image data in the plurality of frames of image data in which the foreign object(s) are recognized.

Here, the storage cabinet can separately determine whether there exists a foreign object in each frame of image data, so as to obtain the number of the frames of image data in the plurality of frames of image data in which the foreign object(s) have been recognized.

For example, the first preset numerical value is ½ of the number of the plurality of frames of image data, the number of the plurality of frames of image data is 5, and the number of the frames of image data in the plurality of frames of image data in which the foreign object(s) have been recognized is 3. That is, the number of the frames of image data in which the foreign object(s) are detected is greater than ½ of the number of the plurality of frames of image data. In this case, the storage cabinet outputs the alarm information.

Further, after outputting the alarm information, the storage cabinet may delete the plurality of frames of image data. In this way, if the storage cabinet is opened again later, the storage cabinet can acquire another plurality of frames of image data of the inside of the storage cabinet again.

In case 4, the total number of times the foreign object(s) are recognized refers to the total number of foreign object(s) recognized during a process of openings the storage cabinet multiple times between the current time and the first time.

Here, after performing an opening operation each time, the storage cabinet may determine foreign object(s) and the number of the foreign object(s) included in a plurality of frames of image data according to the plurality of frames of image data acquired during the opening operation. The opening operation refers to an operation of opening the storage cabinet and closing the storage cabinet. In this way, the storage cabinet can determine the total number of foreign object(s) according to the number of foreign object(s) recognized each time during multiple consecutive opening operations. During the multiple consecutive first operations, the storage cabinet does not output the alarm information.

For example, the storage cabinet outputs the alarm information at the first time. From a second time to a third time after the first time, the opening operation is performed on the storage cabinet three times, and the storage cabinet does not output the alarm information from the second time to the third time. The storage cabinet acquires a plurality of frames of image data during a process of being performed with the opening operation first time, and recognizes the plurality of frames of image data. The total number of times foreign object(s) have been recognized is 3. The storage cabinet acquires another plurality of frames of image data during a process of being performed with the opening operation second time, and recognizes the another plurality of frames of image data. The total number of times foreign object(s) have been recognized is 4. The storage cabinet acquires yet another plurality of frames of image data during a process of being performed with the opening operation third time, and recognizes the yet another plurality of frames of image data. The total number of times foreign object(s) have been recognized is 3. Then, from the second time to the third time, the total number of times foreign object(s) have been recognized by the storage cabinet is 10, i.e., 3+4+3=10.

As another example, the opening operation is performed on the storage cabinet three times from the second time to the third time. During the process of being performed with the opening operation first time, the storage cabinet recognizes that there exist a foreign object 1 and a foreign object 2 in the plurality of frames of image data, and the number of times each of the foreign object 1 and the foreign object 2 has been recognized is 3. During the process of being performed with the opening operation second time, the storage cabinet recognizes that there exist the foreign object 1, the foreign object 2 and a foreign object 3 in the plurality of frames of image data, the number of times each of the foreign object 1 and the foreign object 2 has been recognized is 3, and the number of times the foreign object 3 has been recognized is 1. During the process of being performed with the opening operation third time, the storage cabinet recognizes that there exist the foreign object 1, the foreign object 2 and the foreign object 3 in the plurality of frames of image data, the number of times each of the foreign object 1 and the foreign object 2 has been recognized is 3, and the number of times the foreign object 3 has been recognized is 1. Then, from the second time to the third time: the total number of times the foreign object 1 has been recognized is 9, i.e., 3+3+3=9, the total number of times the foreign object 2 has been recognized is 9, i.e., 3+3+3=9, and the total number of times the foreign object 3 has been recognized is 2, i.e., 0+1+1=2. The storage cabinet may determine whether to output the alarm information according to the total number of times the foreign object 1 or the foreign object 2 has been recognized.

Further, after recognizing a foreign object in the plurality of frames of image data, the storage cabinet can calculate a similarity between feature information of the foreign object and feature information in the foreign object feature information library. The foreign object feature information library can be used to store feature information of foreign objects in the plurality of frames of image data.

It will be noted that when the storage cabinet acquires the plurality of frames of image data and does not recognize the plurality of frames of image data, the foreign object feature information library is empty. Subsequently, the foreign object feature information library may store feature information of foreign objects recognized in the plurality of frames of image data.

In an example, for any frame of image data in the plurality of frames of image data (denoted as first image data), the storage cabinet detects that the first image data includes a foreign object (denoted as a foreign object 1). In a case where the foreign object feature information library includes at least one foreign object, the storage cabinet may calculate a similarity between feature information of the foreign object 1 and feature information of each foreign object in the at least one foreign object. The at least one foreign object refers to the foreign object recognized in image data whose capturing moment is before the first image data in the plurality of frames of image data. If the foreign object feature information library is empty, the storage cabinet can write the feature information of the foreign object 1 into the foreign object feature information library.

For example, in the case where the foreign object feature information library includes at least one foreign object, if the similarity between the feature information of the foreign object 1 and feature information of a certain foreign object in the at least one foreign object is greater than a preset value (i.e., a second preset value), the storage cabinet can increase a first number of the foreign object 1 by a first value (e.g., 1). The first number refers to the number of times the foreign object 1 exists in image data whose capturing moment is before the first image data among the plurality of frames of image data.

If the similarity between the feature information of the foreign object 1 and the feature information of the at least one foreign object is less than or equal to the preset value, it means that the foreign object feature information library does not include the feature information of the foreign object. The storage cabinet can write the feature information of the foreign object 1 into the foreign object feature information library, or the storage cabinet can update the foreign object feature information library, where the updated foreign object feature information library includes the feature information of the foreign object 1.

In another example, in a case where the storage cabinet recognizes that a single frame of image data includes a plurality of different foreign objects, if such a foreign object exists in the plurality of foreign objects, and a similarity between feature information of this foreign object and feature information of each of at least one foreign object in the foreign object feature information library is less than the preset value, the storage cabinet may update the foreign object feature information library, and the updated foreign object feature information library includes the feature information of this foreign object.

For example, the storage cabinet detects that the first image data includes a foreign object 1 and a foreign object 2, and the storage cabinet may calculate a similarity between feature information of the foreign object 1 and the feature information in the foreign object feature information library, and a similarity between feature information of the foreign object 2 and the feature information in the foreign object feature information library. Here, the similarity between the feature information 1 of the foreign object 1 and feature information of each of at least one foreign object in the foreign object feature information library is less than the preset value, the storage cabinet updates the foreign object feature information library, and the updated foreign object feature information library includes the feature information of the foreign object 1.

If a similarity between the feature information of the foreign object 1 and feature information of a foreign object a in the foreign object feature information library is greater than the preset value, the storage cabinet may increase the first number of the foreign object 1 by the first value (e.g., 1). In a case of calculating the similarity between the feature information of the foreign object 2 and the feature information of the foreign object in the foreign object feature information, the storage cabinet may not calculate the similarity between the feature information of the foreign object 2 and the feature information of the foreign object a. In this way, the amount of calculation may be reduced.

It will be noted that since the similarity between the feature information of the foreign object 1 and the feature information of the foreign object a is greater than the preset value, it means that the foreign object 1 and the foreign object a are the same item. The foreign object 1 and the foreign object 2 are different, therefore, the feature information of the foreign object 2 and the feature information of the foreign object a are also different. Therefore, in order to reduce the amount of calculation, the similarity between the feature information of the foreign object 2 and the feature information of the foreign object a may not be calculated.

For example, if the similarity between the feature information of the foreign object 1 and feature information of each foreign object in the foreign object feature information library is less than or equal to the preset value, the storage cabinet updates the foreign object feature information library, and the updated foreign object feature information library includes the feature information of the foreign object 1.

Next, in a case where the storage cabinet calculates a similarity between the feature information of the foreign object 2 and feature information of each foreign object in the updated foreign object feature information library, the storage cabinet may not calculate a similarity between the feature information of the foreign object 2 and the feature information of the foreign object 1.

It will be noted that in the embodiments of the present disclosure, in order to more accurately determine whether there exists a foreign object during each door opening process, the storage cabinet may initialize the foreign object feature information library after the recognition on the plurality of frames of image data is completed. That is, all feature information in the foreign object feature information library is deleted. In this way, during the next door opening process, the storage cabinet can restart adding feature information in the foreign object feature information library according to a plurality of frames of image data acquired again.

Further, in a case where the storage cabinet detects that the image data includes a foreign object, if the foreign object feature information library is empty or the foreign object feature information library does not include feature information of the foreign object, the storage cabinet can write the feature information of the foreign object into the foreign object in the feature information library.

For example, the storage cabinet acquires 5 frames of image data during a single door opening process, and the storage cabinet detects that the first frame of image data in the 5 frames of image data includes a foreign object 1. The foreign object feature information is empty during this process, and the storage cabinet may write feature information of the foreign object 1 into the foreign object feature information library, and record the number of times the foreign object 1 exists as the first value (e.g., 1). The storage cabinet recognizes that there exists a foreign object in the second frame of image data, and can calculate a similarity between feature information of this foreign object and the feature information of the foreign object 1 in the foreign object feature information library. If the similarity is greater than the preset value, it means that the foreign object in the second frame of image data is the same as the foreign object 1. The storage cabinet can increase the number of times the foreign object 1 exists by the first value to a second value (i.e., 2).

As another example, if other foreign objects (such as a foreign object 2) are recognized in the second frame of image data, the storage cabinet can calculate the similarity between the feature information of the foreign object 2 and the feature information of the foreign object 1, and if the similarity is less than or equal to the preset value, the storage cabinet may write the feature information of the foreign object 2 into the foreign object feature information library, and record the number of times the foreign object 2 exists as the first value. Alternatively, the storage cabinet may not calculate the similarity between the foreign object 1 and the foreign object 2, directly write the feature information of the foreign object 2 into the foreign object feature information library, and record the number of times the foreign object 2 exists as the first value.

In this case, the foreign object feature information library includes the feature information of the foreign object 1 and the feature information of the foreign object 2. If a foreign object 3 is also recognized in the second frame of image data, the storage cabinet can calculate a similarity between feature information of the foreign object 3 and the feature information of the foreign object 1. If the similarity between the feature information of the foreign object 3 and the feature information of the foreign object 1 is less than or equal to the preset value, the storage cabinet may directly write the feature information of the foreign object 3 into the foreign object feature information library. Similarly, each time the storage cabinet recognizes a foreign object in the image data, the storage cabinet can calculate a similarity between feature information of this foreign object and feature information of the foreign object in the foreign object feature information library, and count the total number of times each foreign object is recognized. In this way, the storage cabinet can obtain the foreign objects recognized in the plurality of frames of image data and the total number of times the foreign objects are recognized.

Based on the technical solution in FIG. 6, after acquiring the feature information of the item in each frame of image data, the storage cabinet may detect whether the item in the image data belongs to the storage cabinet according to the preset feature information library. Since the preset feature information library includes feature information of a plurality of items belonging to the storage cabinet, the storage cabinet may accurately detect whether there exists a foreign object in each frame of image data.

Figure 7:
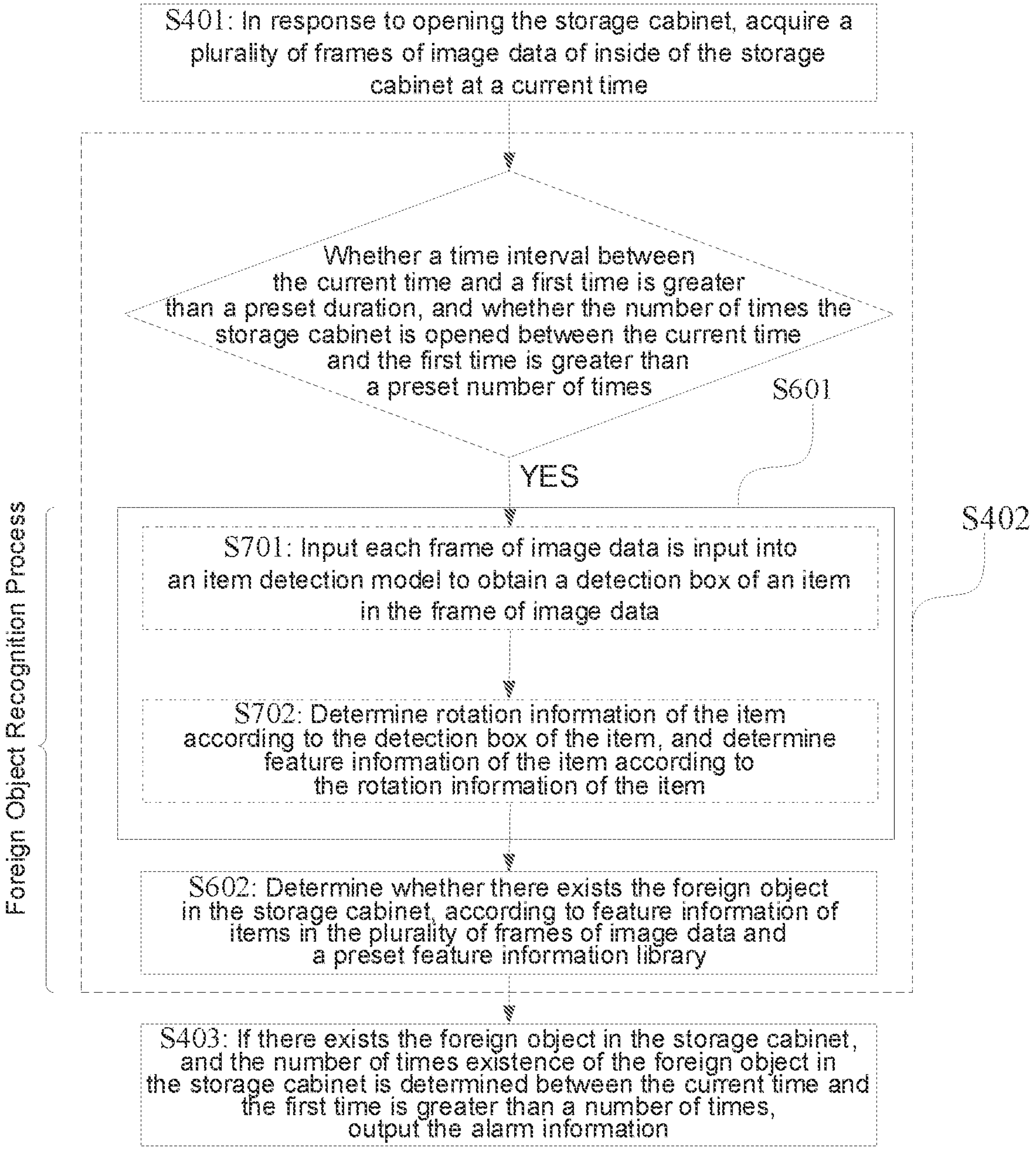
FIG. 7 is a flowchart of a method for managing a storage cabinet in accordance with some embodiments.

In some embodiments, as shown in FIG. 7, in the above S601, the storage cabinet may also acquire the feature information of the item in the image data by means of rotation detection, the process of which may include steps S701 and S702.

In S701, each frame of image data is input into an item detection model to obtain a detection box of an item in the frame of image data.

Here, the item detection module can be used to detect the detection box of the item in the image data. The detection box may be a rectangular detection box. The input of the item detection model is image data, and an item has a detection box in the output image data.

Figure 8:
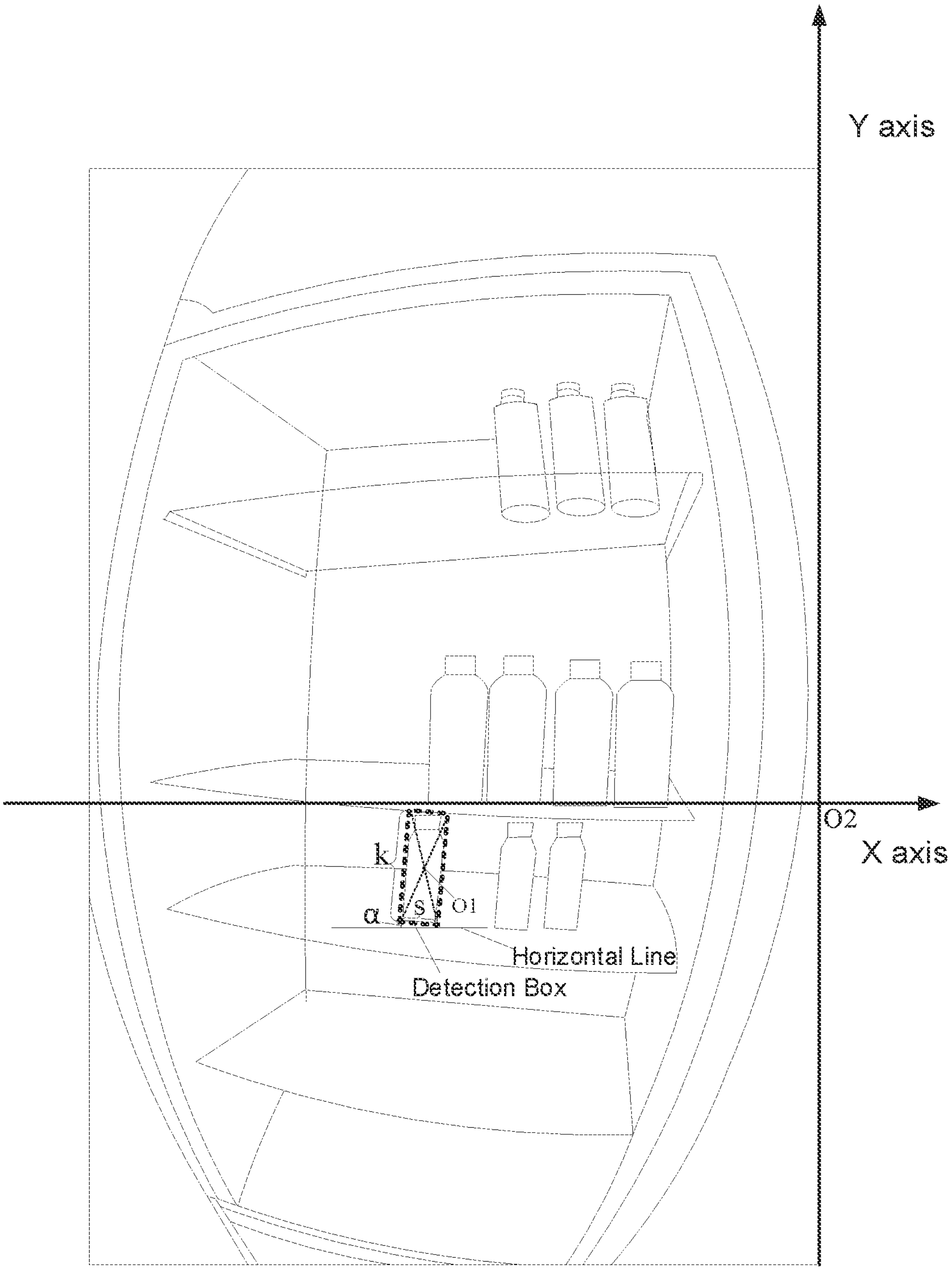
FIG. 8 is a schematic diagram showing rotation information of an item in accordance with some embodiments.

For example, in combination with the image data in FIG. 2, as shown in FIG. 8, a detection box of an item may refer to a rectangular box with the smallest area capable of covering the item.

Here, the item detection model may be pre-configured for the storage cabinet, or may be acquired by the storage cabinet from other devices, which is not imitated. The item detection model can be obtained by training a plurality of samples with detection boxes according to a preset algorithm.

In S702, rotation information of the item is determined according to the detection box of the item, and feature information of the item is determined according to the rotation information of the item.

Here, the rotation information of the item refers to location information of the item in the storage cabinet. The location information includes coordinate information, and length, width, and rotation angle of the detection box. Here, the coordinate information may refer to coordinate data of the center point of the item, and the rotation angle may refer to an angle between the bottom edge of the detection box of the item and the horizontal plane.

For example, as shown in FIG. 8, location information of the camera of the storage cabinet may serve as the origin O2, the horizontal line is the X axis, and the vertical line is the Y axis, so that a plane coordinate system xoy is established. Rotation information of an item 1 is (x, y, k, s, $\alpha$). Among them, x is the abscissa of the center point O1 of the item 1 in the plane coordinate system xoy, y is the ordinate of the center point O1 of the item 1 in the plane coordinate system xoy, k is the length of a detection box of the item 1, s is the width of the detection box of the item 1, and a is an included angle between the bottom edge of the detection box of the item 1 and the X axis (that is, a rotation angle).

In a possible implementation, after obtaining the rotation information of the item, the storage cabinet may determine vertex coordinates of the detection box of the item (such as coordinates of four vertices of the detection box of the item 1) according to the rotation information of the item. The specific process may refer to the prior art, and will not be repeated.

Further, after obtaining the vertex coordinates of the detection box of the item in the image data, the storage cabinet can determine sub-image data of the item included in the image data according to the vertex coordinates of the detection box of the item (the sub-image data corresponds to the smallest region including the item in the image), and input the sub-image data into the item recognition model to obtain the feature information of the item.

Based on the technical solution in FIG. 7, in the rotation detection, the sub-image data including only one item is first determined from the image data, and then each piece of sub-image data is detected by the item recognition model to obtain the feature information of the item. Since the sub-image data only includes one item, the feature information of the item may be quickly obtained through the item recognition model. And also, the interference of other items in the image data may be reduced, improving the recognition accuracy.

Figure 9:
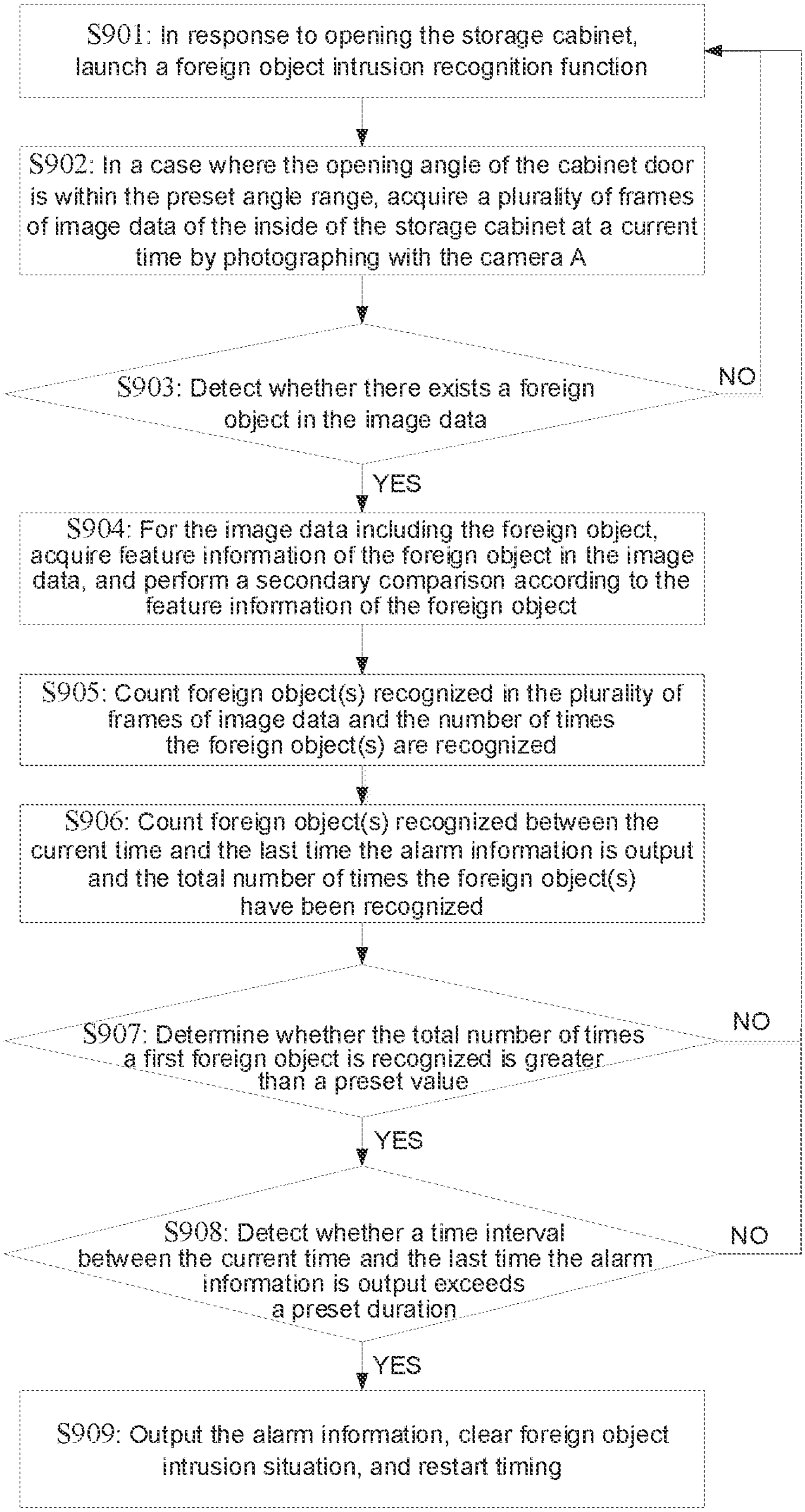
FIG. 9 is a flowchart of a method for managing a storage cabinet in accordance with some embodiments.

In some embodiments, as shown in FIG. 9, embodiments of the present disclosure provide another method for managing the storage cabinet, which includes steps S901 to S909.

In S901, in response to opening the storage cabinet, a foreign object intrusion recognition function is launched.

Here, the foreign object intrusion recognition function refers to that the storage cabinet starts to acquire the image data of the inside of the storage cabinet, and recognizes whether the image data includes a foreign object and counts the number of foreign object intrusions.

In S902, in a case where the opening angle of the cabinet door is within the preset angle range, a plurality of frames of image data of the inside of the storage cabinet at a current time are acquired by photographing with the camera A.

In S903, it is detected whether there exists a foreign object in the image data.

If there exists the foreign object, S904 is executed; and if there exists no foreign object, S901 is executed again.

In S904, for the image data including the foreign object, feature information of the foreign object in the image data is acquired, and a secondary comparison is performed according to the feature information of the foreign object.

Here, the secondary comparison may refer to comparing the feature information of the foreign object with the feature information in the foreign object feature information library.

In S905, foreign object(s) recognized in the plurality of frames of image data and the number of times the foreign object(s) are recognized are counted.

In S906, foreign object(s) recognized between the current time and the last time the alarm information is output and the total number of times the foreign object(s) have been recognized are counted.

Here, S906 may also be described as counting the foreign object(s) recognized and the total number of times the foreign object(s) have been recognized during multiple door opening processes between the current time and the last time the alarm information is output.

In S907, it is determined whether the total number of times a first foreign object is recognized is greater than a preset value.

Here, if the total number of times the first foreign object has been recognized is greater than the preset value, S908 is executed; and if the total number of times the first foreign object has been recognized is less than or equal to the preset value, S901 is executed.

In S908, it is detected whether a time interval between the current time and the last time the alarm information is output exceeds a preset duration.

If it exceeds, S909 is executed; and if not, S901 is executed.

In S909, the alarm information is output, foreign object intrusion situation (i.e., a foreign object intrusion record) is cleared, and timing is restarted.

Here, clearing the foreign object record refers to deleting the counted number of foreign object intrusions.

Based on the technical solution in FIG. 9, only if the number of times the storage cabinet is opened exceeds the preset number of times, and the time interval between the current time and the last time the alarm information is output exceeds the preset duration, the storage cabinet determines whether there exists a foreign object in the storage cabinet according to the plurality of frames of image data acquired. And only if the number of counted foreign objects exceeds the preset number, the storage cabinet outputs the alarm information, which reduces the number of alarms. Moreover, the storage cabinet detects whether there is the foreign object in the storage cabinet according to the plurality of frames of images, so the accuracy of foreign object detection may be improved and the probability of misjudgment may be reduced.

In some embodiments, the embodiments of the present disclosure provide a method for managing the storage cabinet, the method includes: in response to an operation of opening the storage cabinet, acquiring the plurality of frames of image data of the inside of the storage cabinet at the current time; increasing the number of opening times by the first value; performing image recognition on the plurality of frames of image data; and if the number of opening times is greater than a preset threshold, and the time interval between the current time and the last time the alarm information is transmitted is greater than the preset duration, outputting the alarm information and deleting the recorded number of opening times.

Based on these embodiments, after the storage cabinet outputs the alarm information, in order to avoid the problem of frequent alarms, each time after the alarm information is output, the storage cabinet may clear the counted opening times, so that when the cabinet door is opened again later, the storage cabinet restarts counting opening times.

It will be noted that various embodiments of the present disclosure may learn from or refer to each other. For example, same or similar steps, method embodiments, system embodiments and device embodiments may refer to each other, which are not limited.

Embodiments of the present disclosure may divide an apparatus for managing the storage cabinet into functional modules or functional units according to the above method examples, for example, the apparatus may be divided into various functional modules or functional units corresponding to various functions, or two or more functions may be integrated in a single processing module. The above integrated module can be realized either in the form of hardware or in the form of software functional modules or functional units. Here, the division of the modules or units in the embodiments of the present disclosure is schematic and is merely a logical functional division, and there may be other divisions when actually realized.

Figure 10:
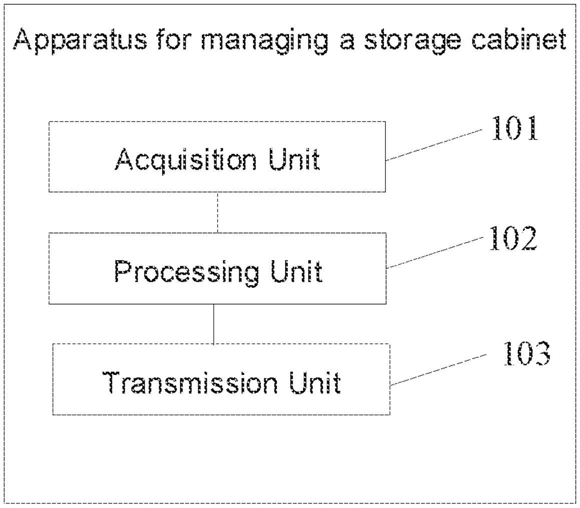
FIG. 10 is a structural diagram of a management apparatus in accordance with some embodiments.

As shown in FIG. 10, FIG. 10 is a schematic structural diagram of an apparatus for managing a storage cabinet provided by the embodiments of the present disclosure. The apparatus includes: an acquisition unit 101, a processing unit 102 and a transmission unit 103.

The acquisition unit 101 is configured to, in response to opening the storage cabinet, acquire a plurality of frames of image data of inside of the storage cabinet at a current time.

The processing unit 102 is configured to, if a time interval between the current time and a first time is greater than a preset duration, and a number of times the storage cabinet is opened between the current time and the first time is greater than a first preset number of times, determine, according to the plurality of frames of image data, whether there exists a foreign object in the storage cabinet. The first time is a time when alarm information is transmitted before the current time, and the alarm information is used to alert that the foreign object exists in the storage cabinet.

The transmission unit 103 is configured to, if there exists the foreign object in the storage cabinet, and a number of times existence of the foreign object in the storage cabinet is determined between the current time and the first time is greater than a second preset number of times, transmit the alarm information.

In some embodiments, the acquisition unit 101 is configured to, in a case where an opening angle of a cabinet door of the storage cabinet is within a preset angular range and angular acceleration of the cabinet door is within a preset angular acceleration range, capture images of the inside of the storage cabinet a plurality of times to obtain the plurality of frames of image data.

In some embodiments, the preset angular range is any angular range between 45 degrees and 50 degrees, and the preset angular acceleration range is any angular acceleration range between 0 and 10 radians per second squared.

In some embodiments, the processing unit 102 is configured to, acquire feature information of items in each frame of image data in the plurality of frames of image data; and determine, according to feature information of items in the plurality of frames of image data and a preset feature information library, whether there exists the foreign object in the storage cabinet. The preset feature information library includes feature information of a plurality of items belonging to the storage cabinet, and the foreign object refers to an item that does not belong to the storage cabinet.

In some embodiments, the processing unit 102 is configured to, if there exists an item in all the items included in the plurality of frames of image data, a similarity between feature information of the item and feature information of any one of items in the preset feature information library is less than a first preset value, and a total number of times the item has been recognized is greater than or equal to a first preset numerical value, determine that there exists the foreign object in the storage cabinet; and if similarities between the feature information of all the items included in the plurality of frames of image data and feature information of the items in the preset feature information library are all greater than or equal to the first preset value, or the total number of times the item has been recognized is less than the first preset numerical value, determine that there exists no foreign object in the storage cabinet.

In some embodiments, the processing unit 102 is further configured to, for any frame of image data in the plurality of frames of image data, in a case where a foreign object feature information library includes feature information of at least one foreign object, if it is determined that there exists a foreign object in the frame of image data and a similarity between feature information of the foreign object in the frame of image data and the feature information of the foreign object in the foreign object feature information library is greater than a second preset value, increase a number of times the foreign object has been recognized by a first value to obtain a total number of times the foreign object has been recognized; and if the similarity between the feature information of the foreign object in the frame of image data and the feature information of the foreign object in the foreign object feature information library is less than or equal to the second preset value, write the feature information of the foreign object in the frame of image data into the foreign object feature information library. The foreign object feature information library includes feature information of a foreign object recognized in image data whose capturing moment is earlier than the frame of image data in the plurality of frames of image data.

In some embodiments, if the foreign object feature information library is empty, and there exists the foreign object in the frame of image data, the feature information of the foreign object in the frame of image data is written into the foreign object feature information library.

In some embodiments, the processing unit 102 is further configured to, if the time interval between the current time and the first time is less than or equal to the preset duration, or if the number of times the storage cabinet is opened between the current time and the first time is less than or equal to the first preset number of times, delete the plurality of frames of image data.

In some embodiments, the processing unit 102 is further configured to, if a number of the plurality of frames of image data is greater than a second preset quantity, delete at least one frame of image data with an earliest capturing moment in the plurality of frames of image data, an amount of image data after deletion being less than or equal to the second preset quantity.

In some embodiments, the processing unit 102 is configured to, in response to closing the storage cabinet, determine, according to the plurality of frames of image data, whether there exists the foreign object in the storage cabinet.

In some embodiments, the processing unit 102 is configured to, in a case where the plurality of frames of image data include a plurality of foreign objects and the plurality of foreign objects are different, if a total number of times a first foreign object has been recognized is greater than a third preset number of times, determine that there exists the foreign object in the storage cabinet. The first foreign object is a foreign object that has been recognized most times in the plurality of foreign objects.

In some embodiments, any two frames of the plurality of frames of image data correspond to different capturing angles.

When implemented by hardware, the acquisition unit 101 and the transmission unit 103 in the embodiments of the present disclosure may be integrated on a communication interface, and the processing unit 102 may be integrated on a processor. The specific implementation is shown in FIG. 11.

Figure 11:
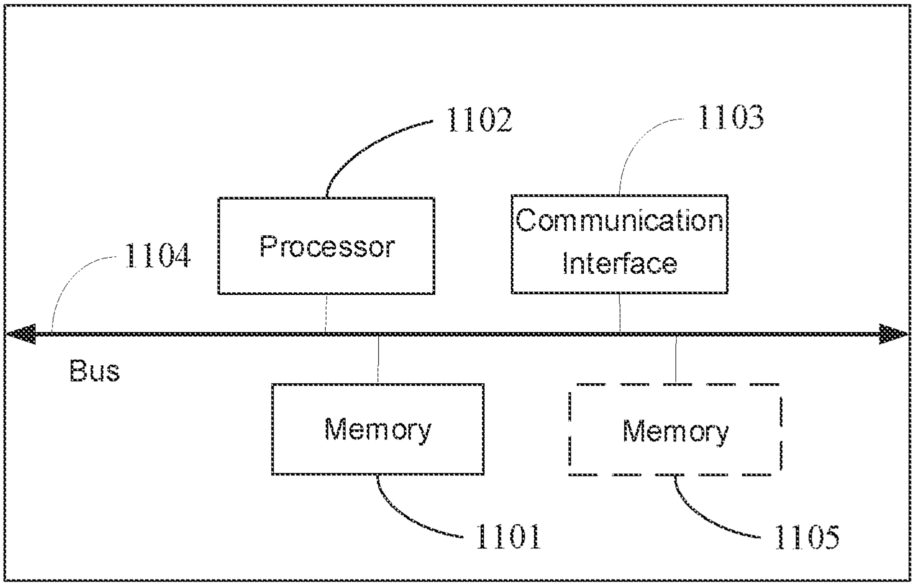
FIG. 11 is a structural diagram of a management apparatus in accordance with some embodiments.

FIG. 11 is another possible structural schematic diagram of the apparatus for managing the storage cabinet involved in the above embodiments. The apparatus includes: a processor 1102 and a communication interface 1103. The processor 1102 is used to control and manage actions of the apparatus, for example, to execute steps executed by the processing unit 102 above-mentioned, and/or to execute other processes of the technology described herein. The communication interface 1103 is used to support communication between the apparatus and other network entities, for example, to execute steps performed by the acquisition unit 101 above-mentioned. The apparatus may further include a memory 1101 and a bus 1104, and the memory 1101 is used to store program codes and data of the apparatus.

Here, the memory 1101 may be a memory in the apparatus. The memory may include a volatile memory, such as a random access memory; alternatively, the memory may include a non-volatile memory, such as a read-only memory, flash memory, hard disk or solid-state hard disk: alternatively, the memory may include a combination of memories of the above-mentioned types.

The processor 1102 may implement or execute various illustrative logical blocks, modules and circuits described in content of the present disclosure. The processor may be a central processing unit, a general-purpose processor, a digital signal processor, an application-specific integrated circuit, a field programmable gate array or other programmable logic device, a transistor logic device, a hardware component, or any combination thereof. It may implement or execute various illustrative logical blocks, modules and circuits described in content of the present disclosure. The processor may also be a combination that implements computing functions, for example, a combination including one or more microprocessors, a combination of a digital signal processor (DSP) and a microprocessor, or the like.

The bus 1104 may be an extended industry standard architecture (EISA) bus or the like. The bus 1104 may be divided into an address bus, a data bus, a control bus and so on. For ease of representation, only a single thick line is used in FIG. 11 to represent the bus, but it does not mean that there is only one bus or one type of bus.

The apparatus in FIG. 11 may also be a chip. The chip includes one or more (including two) processors 1102 and a communication interface 1103.

Optionally, the chip further includes a memory 1105, which may include a read-only memory and a random access memory, and provide operation instructions and data to the processors 1102. A part of the memory 1105 may further include a non-volatile random access memory (NVRAM).

In some implementations, the memory 1105 stores the following elements: execution modules or data structures, or their subsets, or their extended sets.

In the embodiments of the present disclosure, a corresponding operation is executed by calling an operation instruction stored in the memory 1105 (the operation instruction may be stored in an operating system).

Some embodiments of the present disclosure provide a computer-readable storage medium (for example, a non-transitory computer-readable storage medium), the computer-readable storage medium has stored computer program instructions, and the computer program instructions, when executed on a computer (e.g., the storage cabinet), cause the computer to perform the method for managing the storage cabinet according to any of the above embodiments.

For example, the computer-readable storage medium includes, but is not limited to, a magnetic storage device (e.g., a hard disk, a floppy disk or a magnetic tape), an optical disk (e.g., a compact disk (CD), or a digital versatile disk (DVD)), a smart card, and a flash memory device (e.g., an erasable programmable read-only memory (EPROM), a card, a stick or a key driver). Various computer-readable storage media described in the present disclosure may represent one or more devices and/or other machine-readable storage media for storing information. The term “machine-readable storage media” may include, but is not limited to, wireless channels and various other media capable of storing, containing and/or carrying instructions and/or data.

Some embodiments of the present disclosure provide a computer program product, which is stored on, for example, a non-transitory computer-readable storage medium. The computer program product includes computer program instructions, and the computer program instructions, when are executed on a computer (e.g., the storage cabinet), cause the computer to perform the method for managing the storage cabinet according to any of the above embodiments.

Some embodiments of the present disclosure provide a computer program. The computer program, when executed by a computer (e.g., the storage cabinet), causes the computer to perform the method for managing the storage cabinet according to any of the above embodiments.

Beneficial effects of the computer-readable storage medium, the computer program product and the computer program are the same as the beneficial effects of the method for managing the storage cabinet as described in the above embodiments, and details will not be repeated here.

In several embodiments provided in the present disclosure, it will be understood that the disclosed systems, apparatuses and methods may be implemented through other manners. For example, the apparatus embodiments described above are merely schematic. For example, the division of the units described, is merely a logical functional division, and the actual implementation may be divided in another way. For example, multiple units or components may be combined or may be integrated into another system, or some features may be ignored, or not implemented. Another point is that the mutual coupling or direct coupling or communication connection shown or discussed may be an indirect coupling or communication connection through some interfaces, devices or units, which may be electrical, mechanical or in other forms.

The units illustrated as separated components may or may not be physically separated, and components displayed as units may or may not be physical units, i.e., they may be located in one place, or they may be distributed to multiple network units. Some or all of these units may be selected to achieve the purpose of the solutions in the embodiments according to actual needs.

In addition, various functional units in various embodiments of the present disclosure may be integrated in a single processing unit, or each unit may physically exist separately, or two or more units may be integrated in a single unit.

The foregoing descriptions are merely specific implementations of the present disclosure, but the protection scope of the present disclosure is not limited thereto; any person skilled in the art could readily conceive of changes or replacements within the technical scope of the present disclosure, which shall all be included in the protection scope of the present disclosure. Therefore, the protection scope of the present disclosure should be determined by the protection scope of the claims.

What is claimed is:

1. A method for managing a storage cabinet, wherein the method comprises:

in response to opening the storage cabinet, acquiring a plurality of frames of image data of inside of the storage cabinet at a current time, wherein the storage cabinet is used to store items;

if a time interval between the current time and a first time is greater than a preset duration, and a number of times the storage cabinet is opened between the current time and the first time is greater than a first preset number of times, determining, according to the plurality of frames of image data, whether there exists a foreign object in the storage cabinet, wherein the first time is a time when alarm information is transmitted before the current time, and the alarm information is used to alert that the foreign object exists in the storage cabinet; and if there exists the foreign object in the storage cabinet, and a number of times existence of the foreign object in the storage cabinet is determined between the current time and the first time is greater than a second preset number of times, transmitting the alarm information.

2. The method according to claim 1, wherein acquiring the plurality of frames of image data of the inside of the storage cabinet at the current time, includes:

in a case where an opening angle of a cabinet door of the storage cabinet is within a preset angular range and angular acceleration of the cabinet door is within a preset angular acceleration range, capturing images of the inside of the storage cabinet a plurality of times to obtain the plurality of frames of image data.

3. The method according to claim 2, wherein the preset angular range is any angular range between 45 degrees and 50 degrees, and the preset angular acceleration range is any angular acceleration range between 0 and 10 radians per second squared.

4. The method according to claim 1, wherein determining, according to the plurality of frames of image data, whether there exists the foreign object in the storage cabinet, includes:

acquiring feature information of items in each frame of image data in the plurality of frames of image data; and determining, according to feature information of items in the plurality of frames of image data and a preset feature information library, whether there exists the foreign object in the storage cabinet, wherein the preset feature information library includes feature information of a plurality of items belonging to the storage cabinet, and the foreign object refers to an item that does not belong to the storage cabinet.

5. The method according to claim 4, wherein determining, according to the feature information of the items in the plurality of frames of image data and the preset feature information library, whether there exists the foreign object in the storage cabinet, includes:

if there exists an item in all the items included in the plurality of frames of image data, a similarity between feature information of the item and feature information of any one of items in the preset feature information library is less than a first preset value, and a total number of times the item has been recognized is greater than or equal to a first preset numerical value, determining that there exists the foreign object in the storage cabinet; and if similarities between the feature information of all the items included in the plurality of frames of image data and feature information of the items in the preset feature information library are all greater than or equal to the first preset value, or the total number of times the item has been recognized is less than the first preset numerical value, determining that there exists no foreign object in the storage cabinet.

6. The method according to claim 5, further comprising: for first image data, the first image data being any frame of image data in the plurality of frames of image data, in a case where a foreign object feature information library includes feature information of at least one foreign object, if it is determined that there exists a foreign object in the first image data and a similarity between feature information of the foreign object in the first image data and the feature information of the foreign object in the foreign object feature information library is greater than a second preset value, increasing a number of times the foreign object has been recognized by a first value to obtain a total number of times the foreign object has been recognized; and if the similarity between the feature information of the foreign object in the first image data and the feature information of the foreign object in the foreign object feature information library is less than or equal to the second preset value, writing the feature information of the foreign object in the first image data into the foreign object feature information library, wherein the foreign object feature information library includes feature information of a foreign object recognized in image data whose capturing moment is earlier than the first image data in the plurality of frames of image data.

7. The method according to claim 6, further comprising: if the foreign object feature information library is empty, and there exists the foreign object in the first image data, writing the feature information of the foreign object in the first image data into the foreign object feature information library.

8. The method according to claim 5, wherein the first preset numerical value is half of the number of the plurality of frames of image data.

9. The method according to claim 4, wherein if the plurality of frames of image data include a plurality of foreign objects and the plurality of foreign objects are different, determining that there exists the foreign object in the storage cabinet, includes:

if a total number of times a first foreign object has been recognized is greater than a third preset number of times, determining that there exists the foreign object in the storage cabinet, wherein the first foreign object is a foreign object that has been recognized most times in the plurality of foreign objects.

10. The method according to claim 1 further comprising: if the time interval between the current time and the first time is less than or equal to the preset duration, or if the number of times the storage cabinet is opened between the current time and the first time is less than or equal to the first preset number of times, deleting the plurality of frames of image data.

11. The method according to claim 1, further comprising: if a number of the plurality of frames of image data is greater than a second preset quantity, deleting at least one frame of image data with an earliest capturing moment in the plurality of frames of image data, a number of remaining frames of image data being less than or equal to the second preset quantity.

12. The method according to claim 1, wherein determining, according to the plurality of frames of image data, whether there exists the foreign object in the storage cabinet, includes:

in response to closing the storage cabinet, determining, according to the plurality of frames of image data, whether there exists the foreign object in the storage cabinet.

13. The method according to claim 1, wherein any two frames of the plurality of frames of image data correspond to different capturing angles.

14. The method according to claim 1, further comprising: after transmitting the alarm information, deleting the plurality of frames of image data.

15. An apparatus for managing a storage cabinet, wherein the apparatus comprises: a processor and a communication interface, the communication interface is coupled to the processor, and the processor is used to run a computer program or instructions to implement:

in response to opening the storage cabinet, acquiring a plurality of frames of image data of inside of the storage cabinet at a current time, wherein the storage cabinet is used to store items;

if a time interval between the current time and a first time is greater than a preset duration, and a number of times the storage cabinet is opened between the current time and the first time is greater than a first preset number of times, determining, according to the plurality of frames of image data, whether there exists a foreign object in the storage cabinet, wherein the first time is a time when alarm information is transmitted before the current time, and the alarm information is used to alert that the foreign object exists in the storage cabinet; and if there exists the foreign object in the storage cabinet, and a number of times existence of the foreign object in the storage cabinet is determined between the current time and the first time is greater than a second preset number of times, transmitting the alarm information.

16. A storage cabinet, comprising: the apparatus according to claim 15 and a camera, wherein the apparatus is connected to the camera; and the camera is arranged in middle of a cabinet door of the storage cabinet, and faces a cabinet body of the storage cabinet; and the camera is used to capture the plurality of frames of image data of the inside of the storage cabinet in response to opening the storage cabinet.

17. The storage cabinet according to claim 16, further comprising an angle sensor, the angle sensor being arranged on a side on which the cabinet door is connected to the cabinet body, wherein the angle sensor is used to detect an opening angle of the cabinet door of the storage cabinet.

18. The storage cabinet according to claim 16, further comprising one or more light strips, the one or more light strips being arranged on a side of a door frame of the storage cabinet.

19. The storage cabinet according to claim 16, wherein the camera is a fisheye camera.

20. A non-transitory computer-readable storage medium, having stored instructions that, when executed by a computer, cause the computer to perform the method for managing the storage cabinet according to claim 1.

* * * * *